(12) United States Patent
Clemie et al.

(10) Patent No.: US 11,321,807 B1
(45) Date of Patent: May 3, 2022

(54) CENTRALISED INTERACTIVE GRAPHICAL APPLICATION SERVER

(71) Applicant: T5 LABS LTD., London (GB)

(72) Inventors: Graham Clemie, London (GB); Dedrick Duckett, Canton, GA (US)

(73) Assignee: T5 Labs Limited, London (GB)

( * ) Notice: Subject to any disclaimer, the term of this patent is extended or adjusted under 35 U.S.C. 154(b) by 0 days.

(21) Appl. No.: 17/581,904

(22) Filed: Jan. 22, 2022

Related U.S. Application Data

(63) Continuation of application No. 17/130,673, filed on Dec. 22, 2020, which is a continuation of application
(Continued)

(30) Foreign Application Priority Data

| Mar. 1, 2002 | (GB) | ..................................... 0204859 |
| Oct. 11, 2002 | (GB) | ..................................... 0223687 |
| Nov. 9, 2002 | (GB) | ..................................... 0226192 |

(51) Int. Cl.
*H04N 19/40* (2014.01)
*G06T 1/20* (2006.01)
(Continued)

(52) U.S. Cl.
CPC ............. *G06T 1/20* (2013.01); *A63F 13/327* (2014.09); *A63F 13/332* (2014.09); *G06T 1/60* (2013.01); *G06T 9/00* (2013.01); *G06T 15/00* (2013.01); *H04N 19/20* (2014.11); *H04N 19/40* (2014.11); *H04N 19/42* (2014.11); *H04N 19/463* (2014.11); *A63F 2300/203* (2013.01); *A63F 2300/538* (2013.01); *G06T 2210/08* (2013.01); *H04N 19/51* (2014.11)

(58) Field of Classification Search
CPC .................................. G06T 1/20; A63F 13/327
See application file for complete search history.

(56) References Cited

U.S. PATENT DOCUMENTS

| 5,493,644 A | 2/1996 | Thayer et al. |
| 5,574,573 A | 11/1996 | Ray et al. |
(Continued)

FOREIGN PATENT DOCUMENTS

| EP | 0 661 626 | 7/1995 |
| JP | 09212661 | 8/1997 |
(Continued)

OTHER PUBLICATIONS

"The X Resources" Issue 17, Proceedings 10th Annual X Technical Consortium San Jose, California Feb. 12-14, 1996, issue 17.
(Continued)

*Primary Examiner* — Jerry T Jean Baptiste
(74) *Attorney, Agent, or Firm* — Shalom Wertsberger; Saltamar Innovations

(57) ABSTRACT

A system for processing a plurality of graphical programs on a centralized computer system whereby the images produced by the programs are compressed and transmitted to a plurality of remote processing devices where they are decompressed. Compression assistance data (CAD) is produced by intercepting instructions outputted by the programs and the CAD is then used in the compression step.

30 Claims, 8 Drawing Sheets

Related U.S. Application Data

No. 15/819,457, filed on Nov. 21, 2017, now abandoned, which is a continuation of application No. 15/212,349, filed on Jul. 18, 2016, now Pat. No. 9,852,490, which is a continuation of application No. 13/887,538, filed on May 6, 2013, now Pat. No. 9,424,621, which is a continuation of application No. 13/369,280, filed on Feb. 8, 2012, now Pat. No. 8,466,922, which is a continuation of application No. 13/298,266, filed on Nov. 16, 2011, now Pat. No. 8,203,568, which is a continuation of application No. 13/032,401, filed on Feb. 22, 2011, now Pat. No. 8,081,192, which is a continuation of application No. 10/506,151, filed as application No. PCT/GB03/00933 on Mar. 3, 2003, now Pat. No. 7,916,147.

(51) Int. Cl.

| | |
|---|---|
| G06T 15/00 | (2011.01) |
| G06T 9/00 | (2006.01) |
| H04N 19/20 | (2014.01) |
| H04N 19/42 | (2014.01) |
| H04N 19/463 | (2014.01) |
| A63F 13/327 | (2014.01) |
| A63F 13/332 | (2014.01) |
| G06T 1/60 | (2006.01) |
| H04N 19/51 | (2014.01) |

(56) References Cited

U.S. PATENT DOCUMENTS

| | | |
|---|---|---|
| 5,667,440 A | 9/1997 | Sasaki et al. |
| 5,742,289 A | 4/1998 | Naylor et al. |
| 5,758,042 A | 5/1998 | Deschuytere |
| 5,867,166 A | 2/1999 | Myhrvold et al. |
| 5,875,003 A | 2/1999 | Kato et al. |
| 6,057,850 A | 5/2000 | Kichury |
| 6,057,857 A | 5/2000 | Bloomfield |
| 6,100,917 A | 8/2000 | Tsutsui |
| 6,115,038 A | 9/2000 | Christofferson |
| 6,154,186 A | 11/2000 | Smith et al. |
| 6,166,734 A | 12/2000 | Nahi et al. |
| 6,195,797 B1 | 2/2001 | Williams, Jr. |
| 6,292,589 B1 | 9/2001 | Chow et al. |
| 6,307,567 B1 | 10/2001 | Cohen-Or |
| 6,313,838 B1 | 11/2001 | Deering |
| 6,330,281 B1 | 12/2001 | Mann et al. |
| 6,359,624 B1 | 3/2002 | Kunimatsu |
| 6,384,821 B1 | 5/2002 | Burrel et al. |
| 6,426,748 B1 | 7/2002 | Megahed |
| 6,448,958 B1 | 9/2002 | Muta |
| 6,452,600 B1 | 9/2002 | Parikh et al. |
| 6,525,722 B1 | 2/2003 | Deering |
| 6,573,900 B1 | 6/2003 | Lindholm |
| 6,579,184 B1 | 6/2003 | Tanskanen |
| 6,636,214 B1 | 10/2003 | Leather et al. |
| 6,664,969 B1 | 12/2003 | Emerson et al. |
| 6,693,644 B1 | 2/2004 | Moriwaki et al. |
| 6,810,528 B1 | 10/2004 | Chatani |
| 6,828,975 B2 | 12/2004 | Noyle |
| 6,956,576 B1 | 10/2005 | Deering et al. |
| 7,072,984 B1 | 6/2006 | Polonski et al. |
| 7,084,878 B2 | 8/2006 | Herceg et al. |
| 7,103,099 B1 | 9/2006 | Paz et al. |
| 7,176,920 B1 | 2/2007 | Billyard et al. |
| 7,234,144 B2 | 7/2007 | Wilt et al. |
| 7,274,368 B1* | 9/2007 | Keslin .................. G09G 5/36 709/219 |
| 7,587,520 B1 | 9/2009 | Kent et al. |
| 8,099,389 B2 | 1/2012 | Collins |
| 2001/0029205 A1 | 10/2001 | Taho et al. |
| 2002/0033901 A1 | 3/2002 | Martin |
| 2002/0126130 A1 | 9/2002 | Yourlo |
| 2002/0150402 A1 | 10/2002 | Buchanan et al. |
| 2002/0154214 A1* | 10/2002 | Scallie .................. H04N 13/279 348/51 |
| 2003/0011604 A1 | 1/2003 | Capers |
| 2003/0120747 A1 | 6/2003 | Kim |
| 2003/0229719 A1 | 12/2003 | Iwata et al. |
| 2004/0027375 A1 | 2/2004 | Ellis et al. |
| 2004/0080533 A1 | 4/2004 | Nishtala et al. |

FOREIGN PATENT DOCUMENTS

| | | |
|---|---|---|
| WO | WO97/42766 | 11/1997 |
| WO | WO02/060183 | 8/2002 |

OTHER PUBLICATIONS

Mark Levoy:"Polygon-Assisted JPEG and MPEG Compression of Synthetic Images", Computer and Graphics Proceedings. Los Angeles, Aug. 6-11, 1995 Computer Graphics Proceedings (SIGGRAPH), New York, IEEE, US.

Yoon et al.: "Web Based remote rendering with IBRAC (Image-based rendering Acceleration and compression)", European Association for Computer Graphics, 21 annual conference, Eurographics, Interlaken, Switzerland Aug. 21-25, 2000.

Wallach et al. "Accelerated MPEG Compression of Dynamic Polygonal Scens", Computer Graphics Proceedings, Annual Conference Series, SIGGRAPH Jul. 24, 1994, pp. 193-196.

Cass Everitt, "Projective Texture Mapping", Nvidia White Paper, last updated Apr. 24, 2001.

"G-Cluster ports games to the set-top", COMMC'NS, ENG'G & DESIGN, Feb. 1, 2002, http://www.cedmagazine.com/news/2002/01/g-cluster-ports-games-to-the-set-top.

SGI OpenGL VizServer User's Guide, version 4, http://techpubs.sgi.com/library/manuals/4000/007-4245-004/pdf/007-4245-004.pdf © 2001-2002 Silicon Graphics, Inc. Milpitas, CA.

SGI OpenGL VizServer User's Guide, version 5, http://techpubs.sgi.com/library/manuals/4000/007-4245-004/pdf/007-4245-005.pdf © 2001-2002 Silicon Graphics, Inc. Milpitas, CA.

SGI OpenGL VizServer User's Guide, version 6, http://techpubs.sgi.com/library/manuals/4000/007-4245-004/pdf/007-4245-006.pdf © 2001-2002 Silicon Graphics, Inc. Milpitas, CA.

SGI OpenGL VizServer Administrator's Guide, version 1, http://techpubs.sgi.com/library/manuals/4000/007-4481-001/pdf/007-4481-001.pdf © 2002 Silicon Graphics, Inc. Milpitas, CA.

T.Ertl, B. Girod, G. Greiner, H. Niemann, H.-P. Seidel (Eds.) "Vision Modeling and Visualization 2001", Proceedings, Nov. 21-23, 2001, Stuttgart, Germany, ISBN 3-89838-028-9, ISBN 3-58603-221-6, © 2001 Akademische Verlagsgesellschaft Aka GMBH, Berlin.

R. Bernardini, G.M. Cortelazzo, G. Tormen, IBR-Based Compression for Remote Visualizazion, Proc. First International Symposium on 3D Data Processing Visualization and Transmission (3DPVT2002), Padova, Jun. 2002, pp. 513-519.

Klaus Engel, Ove Sommer, Christian Ernst, Thomas Ertl, "Remote Visualization Using Image-Streaming Techniques", Lehrstuhl fur Graphische Datenverarbeitung (IMMD9), Universitat Erlangen-Nurnberg, Am Weichselgarten 9, 91058 Erlangen, Germany.

"Coding of Still Pictures, JPEG 2000 Client-Serer Protocol Requirement Draft", ISO/IEC JTCI/SC29/WG1 N 2380, International Organization for Standardization, Geneva Switzerland, Oct. 2001.

"Coding of Still Pictures, Proposed Communication Structure for JPIP", IS/IEC 1/SC 29/WG1 N2423, International Organization for Standardization, Geneva Switzerland, Feb. 2002.

"Coding of Still Pictures, A Very Simple Proposal for JPIP", ISO/IEC JTC 1/SC 29/WG1 N2445 , International Organization for Standardization, Geneva Switzerland, Mar. 2002.

"Coding of Still Pictures, A Virtual File Media Access mechanism for JPEG200 Images Browsing Over the Internet", ISO/IEC JTC1/SC29/WG1 N1473, International Organization for Standardization, Geneva Switzerland, Nov. 1999.

"Data Distribution Strategies for High-Resolution Displays", Chen et al., Computer & Graphics, vol. 25, Issue 5, 811-818 Oct. 2001.

(56) References Cited

OTHER PUBLICATIONS

"Distributed Rendering of Scalable Displays", Humphreys et al., Proceedings of the IEEE/ACM SC2000 Conference (SC'00) 0-7803-9802-5/00, © 2000 IEEE.

"Efficient and Robust Compression of 2D and 3D Graphics", Dissertation by Zhidong Yan, University of Southern California. ProQuest Dissertations Publishing, Dec. 1999.

"Efficient Image Synthesis on Distributed Architectures", Hancock & Hubbold, University of Manchester, Manchester, England, 1996.

"An Efficient Network Protocol for Virtual Worlds Browsing", R. Bernardini and GM Cartelazzo, in Software Radio Technologies and Services, ISBN 978-1-85233-346-1, Springer Verlag © London, 2001.

"Evaluation and Extensions of SGI Vizserver", Chu, Fowler, and Moorhead, Proc. SPIE 4368, Visualization of Temporal and Spatial Data for Civilian and Defense Applications, (Aug. 23, 2001), https://doi.org/10.1117/12.438110.

"From Image and Video Compression to Computer Graphics" Chen, Proceedings 2000 International Conference on Image Processing (Cat. No.00CH37101), 2000, pp. 9-12 vol.2, doi: 10.1109/ICIP.2000.899211. ISBN 0-7803-6297-7, © IEEE, 2000.

"HTTP Streaming of JPEG2000 Images", Deshpande and Zeng, Proceedings International Conference on Information Technology: Coding and Computing, Apr. 2-4, 2001, ISBN-0-7695-1062-0, © IEEE 2001.

"Model-Based Motion Compensated Compression for Synthetic Animations", Chaddha, *Proceedings of Data Compression Conference—DCC '96*, 1996, pp. 427-, doi: 10.1109/DCC.1996.488355, 1996.

"Non-Invasive, Interactive, Stylized Rendering", Mohr and Gleicher, Proceedings I3D 2001: ACM Symposium on Interactive 3D Graphics, pp. 175-178, 2001.

Open GL Vizserver Product Description, 2001.

Proceedings Visualization '99, Sponsored by IEEE Computer Society Technical Committee on Computer Graphics, Oct. 1999, including "A Distributed Graphics System for Large Tile Displays", Humphryes et al., Stanford University.

"Remote Browsing of JPEG 2000 Images", Taubman, in [Proceedings of IEEE International Conference on Image Processing (ICIP), Rochester, NY Sep. 2002.

"Remote-High-Performance Visualization and Collaboration", Friesen and Tarman, IEEE Computer Graphics and Applications vol. 20, issue 4, pp. 45-49, © IEEE 2000.

"The Remote Rendering Pipeline—Managing Geometry and Bandwidth in Distributed Virtual Environments", Schmalstieg, PhD Thesis, Institute of Computer Graphics and Algorithms, Vienna University of Technology, Vienna, Austria, 1997.

"Scalable Streaming of JPEG2000 Images Using Hypertext Transfer Protocol", Deshpande and Zeng, Proceedings of the ACM Oct. 2001, © 2001 ACM.

SGI OpenGL VizServer Administrator's Guide, version 3.5.1, 007-4481-011, © 2002-2005 Silicon Graphics, Inc. Milpitas, CA.

"Software environments for cluster-based display systems,", Yuqun Chen, Han Chen, D. W. Clark, Zhiyan Liu, G. Wallace and Kai Li, *Proceedings First IEEE/ACM International Symposium on Cluster Computing and the Grid*, 2001, pp. 202-210, doi: 10.1109/CCGRID.2001.923194.

"Talisman: Commodity in Realtime 3D Graphics for the PC", Torborg and Kajiya, SIGGRAPH '96: Proceedings of the 23$^{rd}$ annual conference on Computer Graphics and interactive Techniques, © ACM 1996.

"Tracking Graphics State for Networked Rendering", Buck, Humphreys, and Hanrahan, Proceedings of the ACM SIGGRAPH/EUROGRAPHICS workshop on Graphics Hardware, Aug. 2000, pp. 87-95, © ACM 2000.

"Wireless Transmission of Animated 2D Graphics for Person Digital Assistant (PDA) Systems", Yan et al., Proceedings vol. 3561, Electronic Imaging and Multimedia Systems II, Bejing, China, 1998.

"Defendant Microsoft Corporation Preliminary Invalidity Contentions", US District Court Western District of Texas Case No. 6:21-cv-462-ADA.

"Defendant Microsoft Corporation's Opening Claim Construction Brief" US District Court Western District of Texas Case No. 6:21-cv-462-ADA.

"Exhibit A1—Collins" US District Court Western District of Texas Case No. 6:21-cv-462-ADA.

"Exhibit A-2 Ellis" US District Court Western District of Texas Case No. 6:21-cv-462-ADA.

"Exhibit A-4 Herceg" US District Court Western District of Texas Case No. 6:21-cv-462-ADA.

"Exhibit A 5 Keslin" US District Court Western District of Texas Case No. 6:21-cv-462-ADA.

"Exhibit A 7—Muta" US District Court Western District of Texas Case No. 6:21-cv-462-ADA.

"Exhibit A8 Myjrvold" US District Court Western District of Texas Case No. 6:21-cv-462-ADA.

"Exhibit A-9 Nahi" US District Court Western District of Texas Case No. 6:21-cv-462-ADA.

"Exhibit A-7 Parikh" US District Court Western District of Texas Case No. 6:21-cv-462-ADA.

"Exhibit A-11 Paz" US District Court Western District of Texas Case No. 6:21--462-ADA.

"Exhibit A-12 Robotham" US District Court Western District of Texas Case No. 6:21-cv-462-ADA.

"Exhibit A-13 Parikh" US District Court Western District of Texas Case No. 6:21-cv-462-ADA.

"Exhibit B-1 Collins" US District Court Western District of Texas Case No. 6:21-cv-462-ADA.

"Exhibit B-2 Ellis" US District Court Western District of Texas Case No. 6:21-cv-462-ADA.

"Exhibit B-4 Herceg" US District Court Western District of Texas Case No. 6:21-cv-462-ADA.

"Exhibit B-5 Keslin" US District Court Western District of Texas Case No. 6:21-cv-462-ADA.

"Exhibit B-7 Muta" US District Court Western District of Texas Case No. 6:21-cv-462-ADA.

"Exhibit B-8 Myhrvold" US District Court Western District of Texas Case No. 6:21-cv-462-ADA.

"Exhibit B-9 Nahi" US District Court Western District of Texas Case No. 6:21-cv-462-ADA.

"Exhibit B-10 Parikh" US District Court Western District of Texas Case No. 6:21-cv-462-ADA.

"Exhibit B-11 Paz" US District Court Western District of Texas Case No. 6:21-cv-462-ADA.

"Exhibit B-12 Robotham" US District Court Western District of Texas Case No. 6:21-cv-462-ADA.

"Exhibit B-13 SGI Vizserver" US District Court Western District of Texas Case No. 6:21-cv-462-ADA.

"Exhibit C-1 Collins" US District Court Western District of Texas Case No. 6:21-cv-462-ADA.

"Exhibit C-2 Ellis" US District Court Western District of Texas Case No. 6:21-cv-462-ADA.

"Exhibit C-4 Herceg" US District Court Western District of Texas Case No. 6:21-cv-462-ADA.

"Exhibit C-5 Keslin" US District Court Western District of Texas Case No. 6:21-cv-462-ADA.

"Exhibit C-7 Muta" US District Court Western District of Texas Case No. 6:21-cv-462-ADA.

"Exhibit C-8 Myhrvold" US District Court Western District of Texas Case No. 6:21-cv-462-ADA.

"Exhibit C-9 Nahi" US District Court Western District of Texas Case No. 6:21-cv-462-ADA.

"Exhibit C-10 Parikh" US District Court Western District of Texas Case No. 6:21-cv-462-ADA.

"Exhibit C-11 Paz" US District Court Western District of Texas Case No. 6:21-cv-462-ADA.

"Exhibit C-12 Robotham" US District Court Western District of Texas Case No. 6:21-cv-462-ADA.

"Exhibit C-13 SGI Vizserver" US District Court Western District of Texas Case No. 6:21-cv-462-ADA.

(56) References Cited

OTHER PUBLICATIONS

"Exhibit D-1 Collins" US District Court Western District of Texas Case No. 6:21-cv-462-ADA.
"Exhibit D-2 Ellis" US District Court Western District of Texas Case No. 6:21-cv-462-ADA.
"Exhibit D-4 Herceg" US District Court Western District of Texas Case No. 6:21-cv-462-ADA.
"Exhibit D-5- Keslin" US District Court Western District of Texas Case No. 6:21-cv-462-ADA.
"Exhibit D-7 Muta" US District Court Western District of Texas Case No. 6:21-cv-462-ADA.
"Exhibit D-8 Myhrvold" US District Court Western District of Texas Case No. 6:21-cv-462-ADA.
"Exhibit D-9 Nahi" US District Court Western District of Texas Case No. 6:21-cv-462-ADA.
"Exhibit D-10 Parikh" US District Court Western District of Texas Case No. 6:21-cv-462-ADA.
"Exhibit D-11 Paz" US District Court Western District of Texas Case No. 6:21-cv-462-ADA.
"Exhibit D-12 Robotham" US District Court Western District of Texas Case No. 6:21-cv-462-ADA.
"Exhibit D-13 SGI Vizserver" US District Court Western District of Texas Case No. 6:21-cv-462-ADA.
"Exhibit E-1 Collins" US District Court Western District of Texas Case No. 6:21-cv-462-ADA.
"Exhibit E-2 Ellis" US District Court Western District of Texas Case No. 6:21-cv-462-ADA.
"Exhibit E-4 Herceg" US District Court Western District of Texas Case No. 6:21-cv-462-ADA.
"Exhibit E5 Keslin" US District Court Western District of Texas Case No. 6:21-cv-462-ADA.
"Exhibit E-7 Muta" US District Court Western District of Texas Case No. 6:21-cv-462-ADA.
"Exhibit E-8 Myhrvold" US District Court Western District of Texas Case No. 6:21-cv-462-ADA.
"Exhibit E-9 Nahi" US District Court Western District of Texas Case No. 6:21-cv-462-ADA.
"Exhibit E-10 Parikh" US District Court Western District of Texas Case No. 6:21-cv-462-ADA.
"Exhibit E-11 Paz" US District Court Western District of Texas Case No. 6:21-cv-462-ADA.
"Exhibit E-12 Robotham" US District Court Western District of Texas Case No. 6:21-cv-462-ADA.
"Exhibit E-13 SGI Vizserver" US District Court Western District of Texas Case No. 6:21-cv-462-ADA.
"Exhibit F-1 Collins" US District Court Western District of Texas Case No. 6:21-cv-462-ADA.
"Exhibit F-2 Ellis" US District Court Western District of Texas Case No. 6:21-cv-462-ADA.
"Exhibit F-4 Herceg" US District Court Western District of Texas Case No. 6:21-cv-462-ADA.
"Exhibit F-5 Keslin" US District Court Western District of Texas Case No. 6:21-cv-462-ADA.
"Exhibit F-7 Muta" US District Court Western District of Texas Case No. 6:21-cv-462-ADA.
"Exhibit F-8 Myhrvold" US District Court Western District of Texas Case No. 6:21-cv-462-ADA.
"Exhibit F-9 Nahi" US District Court Western District of Texas Case No. 6:21-cv-462-ADA.
"Exhibit F-10 Parikh" US District Court Western District of Texas Case No. 6:21-cv-462-ADA.
"Exhibit F-11 Paz" US District Court Western District of Texas Case No. 6:21-cv-462-ADA.
"Exhibit F-12 Robotham" US District Court Western District of Texas Case No. 6:21-cv-462-ADA.
"Exhibit F-13 SGI Vizserver" US District Court Western District of Texas Case No. 6:21-cv-462-ADA.
"Exhibit G-1 Collins" US District Court Western District of Texas Case No. 6:21-cv-462-ADA.
"Exhibit G-1 Ellis" US District Court Western District of Texas Case No. 6:21-cv-462-ADA.
"Exhibit G-4 Herceg" US District Court Western District of Texas Case No. 6:21-cv-462-ADA.
"Exhibit G-5 Keslin" US District Court Western District of Texas Case No. 6:21-cv-462-ADA.
"Exhibit G-7 Muta" US District Court Western District of Texas Case No. 6:21-cv-462-ADA.
"Exhibit G-8 Myhrvold" US District Court Western District of Texas Case No. 6:21-cv-462-ADA.
"Exhibit G-9 Nahi" US District Court Western District of Texas Case No. 6:21-cv-462-ADA.
"Exhibit G-10 Parikh" US District Court Western District of Texas Case No. 6:21-cv-462-ADA.
"Exhibit G-11 Paz" US District Court Western District of Texas Case No. 6:21-cv-462-ADA.
"Exhibit G-12 Robotham" US District Court Western District of Texas Case No. 6:21-cv-462-ADA.
"Exhibit H-1 Collins" US District Court Western District of Texas Case No. 6:21-cv-462-ADA.
"Exhibit H-2 Ellis" US District Court Western District of Texas Case No. 6:21-cv-462-ADA.
"Exhibit H-4 Herceg" US District Court Western District of Texas Case No. 6:21-cv-462-ADA.
"Exhibit H-5 Keslin" US District Court Western District of Texas Case No. 6:21-cv-462-ADA.
"Exhibit H-7 Muta" US District Court Western District of Texas Case No. 6:21-cv-462-ADA.
"Exhibit H-8 Myhrvold" US District Court Western District of Texas Case No. 6:21-cv-462-ADA.
"Exhibit H-9 Nahi" US District Court Western District of Texas Case No. 6:21-cv-462-ADA.
"Exhibit H-10 Parikh" US District Court Western District of Texas Case No. 6:21-cv-462-ADA.
"Exhibit H-11 Paz" US District Court Western District of Texas Case No. 6:21-cv-462-ADA.
"Exhibit H-12 Robotham" US District Court Western District of Texas Case No. 6:21-cv-462-ADA.
"Exhibit H-13 SGI Vizserver" US District Court Western District of Texas Case No. 6:21-cv-462-ADA.

\* cited by examiner

CENTRALISED INTERACTIVE GRAPHICAL APPLICATION SERVER

This application claims the right of priority to, and is a continuation of, U.S. patent application Ser. No. 17/130,673, which is a continuation of U.S. patent application Ser. No. 15/819,457 (presently abandoned), which is in turn is a continuation of U.S. patent application Ser. No. 15/212,349 (issued as U.S. Pat. No. 9,852,490), which is in turn a continuation of Ser. No. 13/887,538 (issued as U.S. Pat. No. 9,241,621), which is in turn a continuation of U.S. patent application Ser. No. 13/369,280 (issued as U.S. Pat. No. 8,466,922), which is a continuation of U.S. patent application Ser. No. 13/298,266 (issued U.S. Pat. No. 8,203,568), which is a continuation of U.S. patent application Ser. No. 13/032,401 (issued as U.S. Pat. No. 8,081,192), which is in turn a continuation of U.S. patent application Ser. No. 10/506,151, (issued as U.S. Pat. No. 7,916,147), which in turn claims the right of priority to PCT application No. PCT/GB2003/00933, internationally filed Mar. 3, 2003, which claims the right of priority to United Kingdom patent applications No. 0226192.3 filed Nov. 9, 2002, 0223687.5 filed Oct. 11, 2002, and 0204859.3, filed Mar. 1, 2002. All the above identified applications and patent documents are incorporated herein by reference.

This invention relates to operation of interactive software such as games software and in particular object identification and motion estimation in image compression for improved hosting of the software on a centralised computer platform.

In the field of interactive software such as games, typically, someone wanting to run the interactive software or game may do so using a PC (Personal Computer) or game console such as a Nintendo™ GameCube™ or Sony™ Playstation 2™. The latest games software requires machines with powerful processors and graphics renderers. Each new release of software taxes the capabilities of the hardware to its limits obliging the owner of the hardware to suffer the expense of having to regularly update or replace their hardware.

A further problem with the typical situation is that there are a number of different hardware platforms. A game that runs on the Sega Dreamcast™ will largely need to be re-written to run on a PC or Sony Playstation™. It is therefore expensive for a game developer to fully exploit the market potential of a game whilst consumers must own the appropriate hardware before being able to enjoy a particular game.

There are a variety of known related technologies, which are described below.

Games servers allow for multi-player games such as Quake™ and simply act as central gateways that communicate the location and actions of all the other players participating in a given game. Each player will still need a local copy of the game and a local device capable of processing the software and rendering all the images associated with the game.

Games streamer technology splits a game up into chunks, allowing a user wanting to download a game to commence playing before the whole game has been downloaded. Downloading continues whilst the game is played. This is simply a more convenient way of distributing the software.

Graphics streaming technology streams the graphics elements such as the meshes (wire-frame descriptions of objects) and textures (skins). Amongst others, MPEG-4 (Motion Pictures Expert Group), which is a standard for compressing moving pictures and audio data and for synchronising video and audio data streams, includes methods of compressing meshes and textures for transmission to a remote renderer. Systems utilising this technology will still need a powerful client capable of rendering the images whilst the game itself could be run on a client or server machine.

Web-based games use technologies such as Java™ or Shockwave™ to offer games via Web pages. However, rather than being processed on the server, although the graphics elements might have been compressed, the software is still run on the user's client machine and the graphics is still rendered at the client too.

Centralised game servers are another known technology, which are the particular field of the present invention. By processing the game and rendering images on a central server, users can play games connected to a broadband telecommunications network, such as Digital Subscriber Line (DSL), cable or third generation (3G) wireless network. Such systems remove the necessity of purchasing a dedicated (and expensive) games console or for a PC to be constantly upgraded with the latest processor and graphics card. People wishing to play a game may instantly subscribe to a games service via their cable TV company using their already installed set top box. Cable TV companies thus find a new revenue stream, games developers have access to a wider market with lower distribution costs and end users have the opportunity to dabble with games without having to invest in expensive, dedicated equipment.

Although these networks have relatively high bandwidths when compared to a normal telephone line, the graphics images for high-end games still need to be heavily compressed before transmission. Such a compression system needs to be very fast so that the overall system latency does not detract from the game playing experience.

Instead of each user having their own 'intelligent' devices that are capable of rendering the complex graphics of modern games, the processing is undertaken at a central server. The images relating to the game are compressed at the hub and transmitted over broadband networks to the end users who use relatively 'dumb' terminals to view the images and interact with the games software running on the central server.

This central server needs to be powerful enough to run multiple copies of games software, the compression system and the transmission system so that it can serve a large number of simultaneous users who may be playing different games at the same moment.

The further advantages of such a centralised game servers are:

users do not have to possess dedicated hardware powerful enough to play the latest games;
  by re-utilising the same equipment the service provider (typically a cable TV or telecommunications company) may offer this service far more cost effectively than by providing each customer with a games console or PC;
  games developers may have access to a wider audience as it is no longer dependent on the user possessing the appropriate hardware, merely connection to a broadband network which may be to the home, office or via e.g. a 3G or "WiFi" wireless network, to a mobile device;
  games updates and bug fixes can be instantly and automatically incorporated; and
  online, multi-player cheating may be curtailed by blocking the 'cheat modes'.

However, to make such a system work there are two technical problems that have to be overcome:

quality of compression: the images have to be heavily compressed so as to be able to be transmitted over the typical domestic broadband network such as cable TV or DSL; and network latency: the compression system has to work very quickly. The delay between the user pressing a control, the associated command being processed by the server, the new scene being calculated, compressed, transmitted and then decompressed, has to be negligible to the user.

U.S. Pat. No. 5,742,289 to Lucent, Murray Hill, N.J., discloses a system that encapsulates the games processing with graphics rendering and encoding in a centralised game server. As such it can compress a synthetic image in parallel with the rendering of that image. The patent discloses a system and method with the features of a computer graphics system, including MPEG encoding. The system uses a detailed model of 2D images, including motion vectors and passes compression assistance data forward to an encoder, so as to simplify the encoding process. The complete system includes a shared database of 3D images, hybrid rendering engines and a connected video encoder.

Generally, game graphics are rendered using a dedicated graphics processor, referred to herein as a Graphics Processing Unit (GPU). A problem with the system of U.S. Pat. No. 5,742,289 is that it does not allow the use of standard graphics processors and will therefore need a large number of general processors as well as specially written software to perform the graphics processing. Furthermore, the games software will have to be specially written to run on this new processing platform.

The article "Accelerated MPEG Compression of Dynamic Polygonal Scenes", Dan S. Wallach, Sharma Kunapalli and Michael F. Cohen, Computer Graphics (Proc. SIGGRAPH 1994), July 1994 describes a methodology for using the matrix-vector multiply and scan conversion hardware present in many graphics workstations to rapidly approximate the optical flow in a scene. The optical flow is a 2D vector field describing the on-screen motion of each pixel. An application of the optical flow to MPEG compression is described which results in improved compression with minimal overhead.

The system stores the transformation matrices from two frames and uses an "identity texture" which it projects onto all objects in a scene so that it can find the relationship between an object and the screen. The problem with this approach is that it only works with matrices. It doesn't cope with GPU vertex shader programs which may for example use cosines to emulate ripples across water.

Overall, a first problem with the known approaches is that they assume that the transformations of vertices are done on a Central Processing Unit (CPU) so that the results are stored in local memory and are easily extracted. This means that a game has to have routines enmeshed in it to perform the compression-related tasks. It would be advantageous not to need to have specially written game code.

A second problem, when a GPU is used, is that because the GPU doesn't naturally store the results of the vertex transformation process special techniques are required to extract and store that data.

It would be advantageous to provide a system that is capable of being realised using standard components in a modular fashion to produce a commercially viable solution to these problems.

It is an object of the present invention to improve the quality of compression and reduce latency in hosted interactive graphical systems.

According to a first aspect of the present invention, there is provided a method of generating a compressed video data signal using at least one graphics processor module, comprising:

a) receiving a first set of instructions for a graphics processor module;

b) intercepting said first instructions and generating a second set of instructions for a graphics processor module;

c) processing said first set of instructions or said second set of instructions in a graphics processor module to generate first graphics data;

d) processing said second set of instructions to generate second graphics data;

e) processing said second graphics data to generate compression assistance data; and f) processing said first graphics data, using said compression assistance data, to generate a compressed video data signal.

According to a second aspect of the present invention there is provided apparatus for generating a compressed video data signal, the apparatus comprising at least one graphics processor module, the apparatus comprising:

a) an instruction interception function for receiving a first set of instructions for a graphics processor module and generating a second set of instructions for a graphics processor module;

b) a processing function for processing said first set of instructions or said second set of instructions in a graphics processor module to generate first graphics data;

c) a processing function for processing said second set of instructions to generate second graphics data;

d) a processing function for processing said second graphics data to generate compression assistance data; and e) an encoding function for processing said first graphics data, using said compression assistance data, to generate a compressed video data signal.

The present invention may be used to improve the quality of compression for computer-generated graphics. There are a number of compression technologies currently available, all of which are constantly evolving. To maximise flexibility it is therefore important to have as modular a system as possible so that the compression stage could be replaced or updated without affecting the integrity of the complete solution.

One example of a compression technology is the industry standard MPEG-4. It is unusual in that it doesn't define how images should be encoded, just the protocol of the bit-stream and the method of decoding. It also provides a toolkit of compression methods. The decision process of when and how to apply them will vary from one implementation to another resulting in vastly different quality images and compression ratios.

One option available to an MPEG-4 encoder is the encoding of separate graphical objects within an image. For example, a walking figure as distinct from the background image of a field through which that person is walking. Although encoding the walking figure as a separate object can yield higher compression ratios, to isolate an object from a background scene is a complex and processor-intensive process.

An advantage of working with synthetic video such as from computer graphics is that the individual constituents (objects) of that image are known. In the case of natural video an encoder must first deconstruct the image. Here, by extracting the object definitions before the image is rendered the processing load is lessened.

According to preferred embodiments of the invention, compression assistance data includes motion vector data. Some examples of other types of compression assistance data which may be provided when encoding images with MPEG-4 data compression are:

which parts of a scene—if any—to encode as separate objects (as there is a maximum number)
what form of encoding to use on the objects
whether to encode the shapes as transparent objects or solids
how often to transmit full images rather than simply changes from a previous image (as there is a trade-off between error corrections and bandwidth)
whether or not to use overlapped motion estimation.

The criteria used in making these decisions include:
processing time/effort required to make an analysis
the bandwidth 'budget' left
minimum image quality constraints.

The present invention may also be used to improve network latency. Network latency is dependent on the speed of the encoding sub-system which in itself is a trade-off between the quality of compression and the processing power required. To improve speed the present invention seeks to process some of the encoding steps in parallel to the rendering of the image to be compressed. Furthermore, it seeks ways in which information about the image can be easily extracted without having to reverse engineer it as would normally be the case with a natural video image.

This invention therefore has been developed within the following design constraints:

modularity (separation of the functions of processing of the games software, rendering of the images, encoding of the images) for ease of debugging and upgrading
ability to run existing games software with minimal (or even better no) changes
ability to use off-the-shelf components wherever possible e.g. with a graphics processor.

The instruction interception function may be a device driver. Alternatively the instruction interception function is a wrapper component for DirectX™ or OpenGL™

The instruction interception function may be adapted to input different instructions to different graphics processor modules.

Optionally a plurality of instruction interception functions may each be adapted to input different instructions to different graphics processor modules.

Preferably the instructions comprise graphical data. Optionally, the instructions may comprise program code. Preferably the instructions comprise textures.

Optionally a difference between different instructions comprises lighting instructions. Preferably a difference between different instructions comprises shading instructions.

Preferably, the instructions further comprise 3Dimensional scene information. The same 3Dimensional scene information may be fed to each graphics processor module.

Preferably the instructions fed to a first graphics processor module comprise textures and the instructions fed to a second processor module comprise different new object textures. In one embodiment each of the new object textures is a unique texture for each object in an image frame. Preferably the new object textures are determined so that no two of the textures of neighbouring polygons of an object are the same. The new object textures may be re-orientated in subsequent frames of video. In one embodiment the new object textures are flat colours.

Alternatively the instructions fed to at least one graphics processor module cause it to generate new object textures.

In one embodiment the relationship between a part or parts of an object and its 2D screen representation is rendered into temporary storage for comparing between two or more frames. Preferably it is stored as a texture. Preferably there is one of these textures per object, more than one, or one that is shared by all objects.

In one embodiment, texture to vertex mappings are remapped to attain a "unique texture space" by adding a constant offset. Preferably the texture to vertex mappings are remapped to attain a "unique texture space" by varying the offset.

Alternatively a "unique texture space" may be attained by creating a new texture of the same size and dividing it into a larger number of polygons as in the original and then remapping the object vertices to a unique polygon from the new texture.

In one embodiment a 'reference' texture that corresponds to the pixels of a screen is projected onto a scene for the purpose of identifying where each portion of an object appears on the screen at any moment in time. Preferably the instructions fed to at least one graphics processor module cause it to generate a single texture that covers the entire scene that makes up an image frame and combines with existing surfaces of the objects in said scene to produce new object textures. Typically said single texture is projected onto objects within a scene. Preferably the step of generating a single texture further comprises setting the surface of an object to a default and then altering the single texture so as to create and apply a new surface texture for the object. Preferably the default indicates whether the object is translucent, and preferably the default is unique to each object in an image frame.

In one embodiment, the assistance data generating function is adapted to determine the shapes of objects responsive to the second graphics data.

In another embodiment the assistance data generating function is adapted to determine the positions of image elements responsive to the second graphics data.

Preferably the encoding function is adapted to pick out individual image elements from an image rendered by the first graphics processor module responsive to the compression assistance data.

Optionally, a new object texture may be used to signify to the encoding function that an object is translucent.

Preferably the encoding function is adapted to detect a complete scene change. More preferably the encoding function is adapted to use a different compression method responsive to detection of a complete scene change.

Preferably, each graphics processor module comprises a dedicated graphics processor, typically in the form of a graphics chip. Optionally, two or more dedicated graphics processors are used which are functionally substantially identical.

Alternatively, the function of more than one graphics processor module may be implemented on a single dedicated graphics processor, for example using a multiple time slice processing scheme.

A graphics processor module may be shared between one or more compression sub-systems. A single dedicated graphics processor may be clocked to render frames at a higher frequency than the final display rate.

Preferably, rendered frames are stored in a buffer memory for the encoding function to process.

Handshake signalling may be used between the encoding function and the instruction interception module to co-ordinate the process.

Preferably the new object textures may comprise a numerical value varying corresponding to position in the frame.

More preferably, the new object textures comprise one numerical value varying corresponding to the horizontal co-ordinate, and another one numerical value varying corresponding to the vertical co-ordinate.

Preferably the assistance data generating function is adapted to detect motion between frames by comparing object textures.

Optionally, the assistance data generating function is adapted to detect motion between frames by comparing the pixels on objects against those in a texture that had previously been applied across the entire image frame.

Optionally, the assistance data generating function is adapted to detect motion between frames by comparing information "tagged" to one or more vertices that form part of an object or that relate to that object's position. The tags may for example be colour values. The tags may alternatively include other data that are associated with the vertices. Typically the tags are used to influence the rendering process so that the position of said vertices can be readily identified when the objects they relate to are rendered. The rendering may for example be influenced through varying the colour or brightness of pixels in the rendered image.

Optionally, the assistance data generating function is adapted to detect motion between frames by comparing the relationships between a part or parts of an object and its 2D screen representations whereby such relationships had previously been rendered into temporary storage. The storage may be of one or more textures per object or a texture shared by more than one object.

Optionally the comparison of the pixels on an object may be against a notional, fixed grid or point. Typically, the comparison comprises masking selected bits at at least one pixel co-ordinate. Preferably the comparison comprises at least one subtraction. Preferably the subtraction only occurs where said textures belong to the same polygon of the same object. Optionally the comparison further comprises the step of aggregating the results of said subtraction. Typically the aggregation comprises averaging. Optionally the aggregating comprises deducing a mean.

Preferably the assistance data generating function is adapted to generate a motion vector for an entire block by aggregating the motion vectors of the parts of the objects that occupy that block. Typically the aggregating comprises averaging. Optionally the aggregating comprises deducing the mean.

Preferably the assistance data generally function is adapted to generate a motion vector for an entire object by detecting which pixels in each of the blocks belong to a given object, comparing these pixels with those in the same location in another frame and aggregating the compared pixels to deduce the motion vectors of that object. Typically, aggregating the detected pixels comprises averaging. Typically, the comparison comprises masking selected bits at at least one co-ordinate. Preferably, the comparison comprises subtraction at at least one co-ordinate whereby said textures belong to the same object. Preferably, the entire object to which a motion vector applies includes all the blocks that are deemed to be associated with an object.

Optionally, parameters from the instructions fed to a first graphics processor module are stored and then processed with parameters from a second frame to thereby determine an inter-frame difference that forms part of compression assistance data.

In an alternative embodiment of the invention, the second set of instructions includes a modified or new set of program code for a programmable pipeline module such as a vertex shader program or pixel shader program.

The method may include executing a program on a programmable pipeline module to process first parameters thereby determining a first transformation result, and executing the program on the programmable pipeline module to process second parameters thereby determining a second transformation result.

Typically the transformation result directly relates to a screen position and a determined inter-frame difference value may be determined in the form of a motion vector.

Optionally the transformation result is a colour and the determined inter-frame difference value is a difference in chrominance or luminance.

Preferably the method further includes analysing a first program for a programmable pipeline module to determine those instructions that do not influence the state of an object in a frame that is used for the compression assistance data and creating a second program for a programmable pipeline module in response to the determined instructions.

Preferably the step of analysing the first program for a programmable pipeline module includes determining which parameters influence the position transformation of an object and storing the determined parameters.

Optionally the step of analysing the first program for a programmable pipeline module includes determining which parameters influence the colour or brightness of an object and storing the determined parameters.

Preferably the first program for a programmable pipeline module and the second program for a programmable pipeline module are executed on the same graphics processing module.

Alternatively, the first program for a programmable pipeline module and the second program for a programmable pipeline module are executed on different graphics processing modules.

Preferably a device driver or wrapper around the graphics Application Programming Interface (API) (sometimes referred to as middleware) for a graphics processing module is adapted to reserve program storage space for a programmable pipeline module on the graphics processing module by returning a reduced value of available program storage space on interrogation of the device driver.

More preferably a device driver or wrapper around the graphics API for a graphics processing module is adapted to reserve data storage space for a programmable pipeline module on the graphics processing module by returning a reduced value of available data storage space on interrogation of the device driver.

In order to provide a better understanding of the present invention, an embodiment will now be described by way of example only, with reference to the accompanying Figures, in which.

Figure 9:
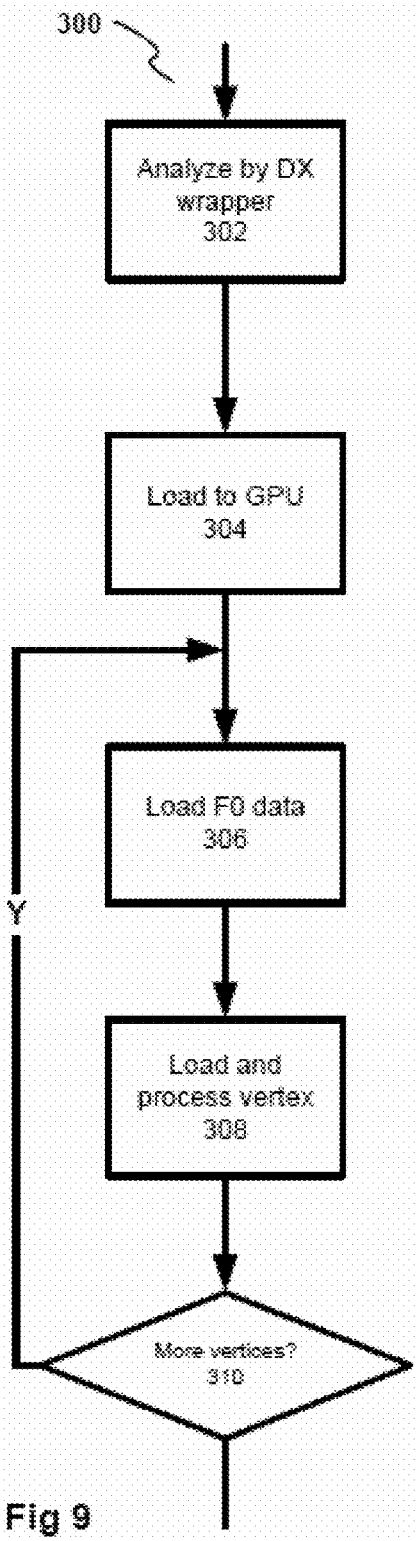
Figure 10:
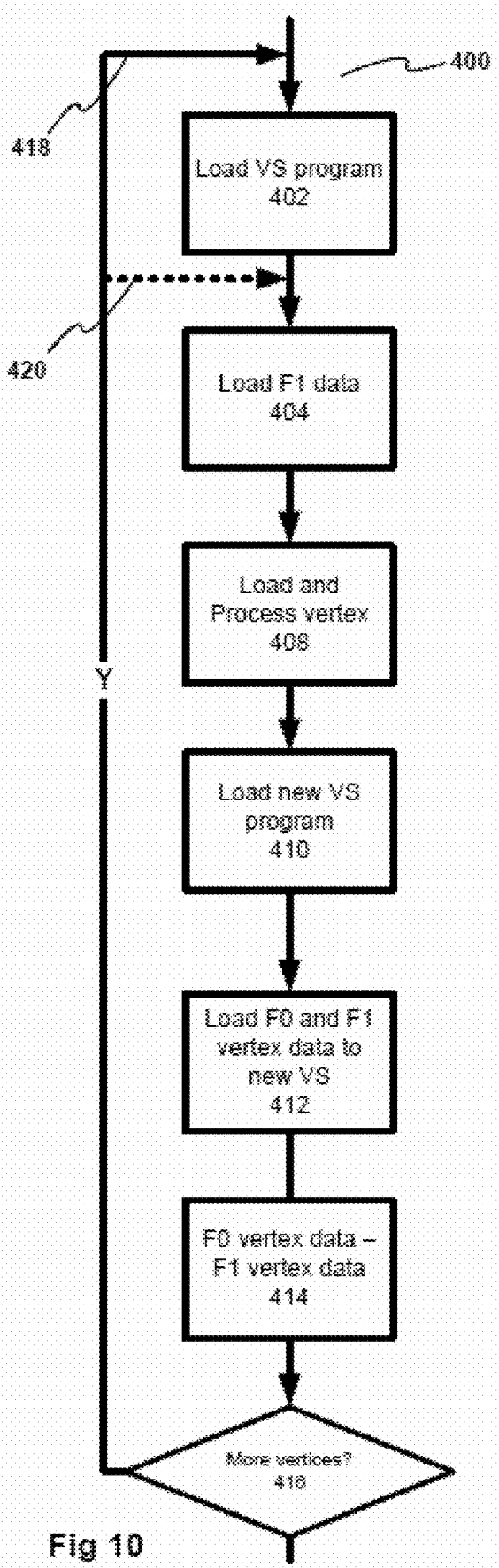

FIG. 9 illustrates a flowchart of the steps for the processing of a first frame in accordance with a preferred embodiment of the present invention; and FIG. 10 illustrates a flowchart of the steps for the processing of a second and subsequent frames in accordance with a preferred embodiment of the present invention The present invention relates to a system for interactive applications that functions to generate compressed data streams representing video images which include computer-generated graphics. Information relating to the field of computer-generated graphics can be found in the textbook "3D Computer Graphics", $3^{rd}$ Edition, Alan Watt, Addison-Wesley, 2000.

Typically, a computer-generated 3D graphical figure is generated in the form of a mesh of polygons that define the shape of a 3D object and a texture which is laid across the mesh using a texture mapping process. Herein, the term "graphical object" may refer to a graphical figure, a single vertex, group of vertices, a "sprite" (collection of pixels) or parameter to a "Bezier patch" or "n patch" function object. A number of separate graphical objects may be combined into a fewer number of logical objects, e.g. walls and floors may be defined as being a single object and thus coated with the same texture. Herein, the term "flat colour" refers to a single colour, without variation across its surface.

Figure 1:
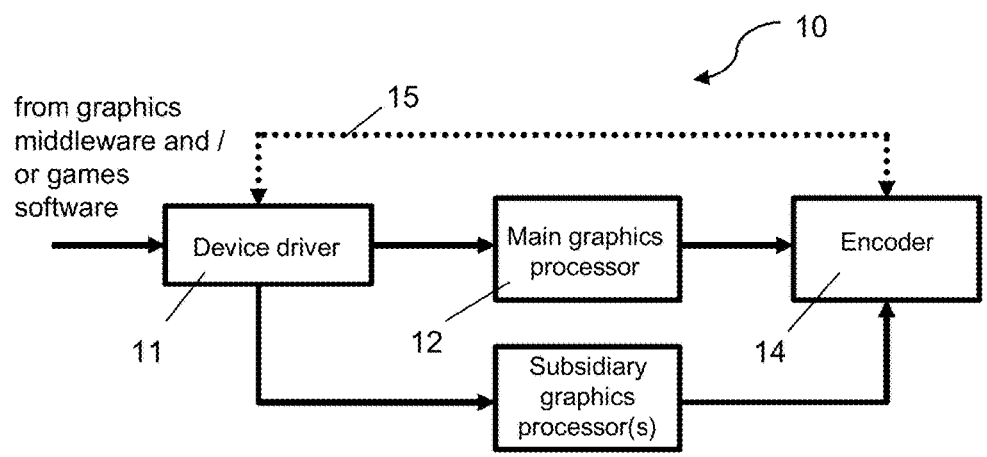
FIG. 1 illustrates in schematic form a centralised interactive graphical application system in accordance with the present invention.

With reference to FIG. 1, a system for interactive applications in accordance with the present invention 10 has an instruction interception module 11, a main graphics processor 12, a subsidiary graphics processor 13 responsive to the instruction interception module, and an encoder 14 responsive to the graphics processors. In this embodiment the encoder is a DSP, alternatively the encoder may be a graphics processor, any CPU, or other processing device. In this embodiment the instruction interception module is a device driver, alternatively the instruction interception module is an addition to existing middleware, such as DirectX™ or OpenGL™. In this embodiment, one instruction interception module feeds two graphics processors, but in another embodiment, there may be more than one instruction interception module, e.g. one per graphics processor. The main graphics processor and the subsidiary graphics processor are graphics processor modules. They may be separate hardware units, or separate processes executed on one hardware unit.

Figure 2:
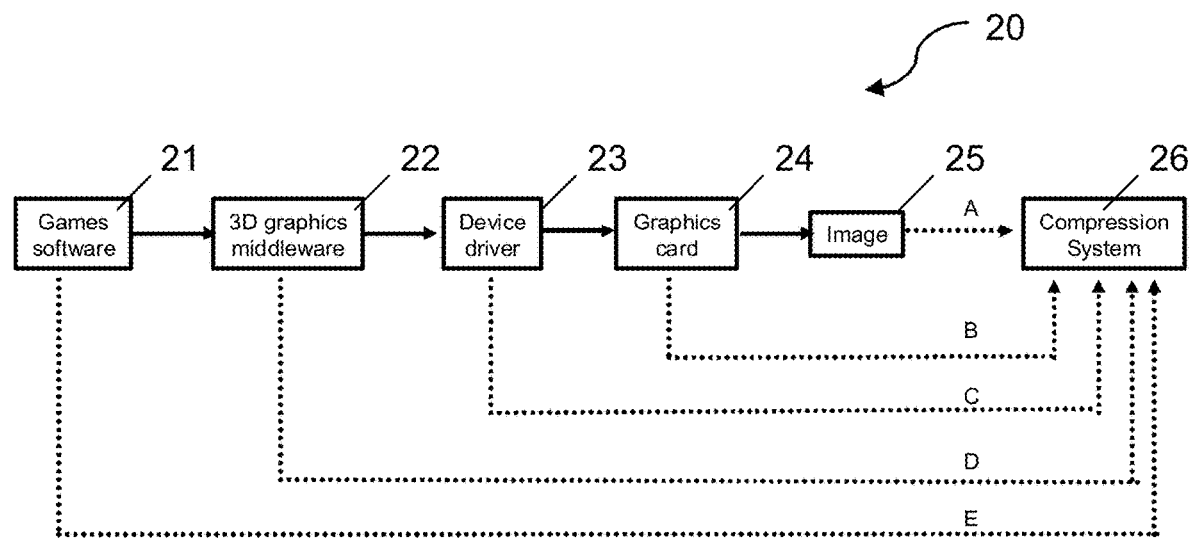
FIG. 2 illustrates in schematic form a typical pipeline for the processing of a game.

FIG. 2 shows a typical pipeline for the processing of a game comprising games software 21, 3D graphics middleware 22, a device driver 23, a dedicated graphics processor card 24, a rendered image 25, and a compression system or encoder 26. The dotted lines A to E denote the different sources of information that may be used by the encoding process in the compression sub-system.

Because of the immense processing power required to render the complex scenes of a typical game, the graphics are normally rendered by a dedicated graphics processor chip. In a PC the chip normally resides on a separate card and in a console it is a separate chip in the main box.

The games software 21 feeds the graphics processor 24 with a 3D scene description, including the 3D co-ordinates of points describing objects, their position in 3D space, how they are to be distorted (e.g. a dent in a racing car), what skins ('textures') they are to be covered with, how they are to be lit or shaded (and hence the textures further altered). Following a large amount of processing, a fully rendered 2D image 25 is produced suitable for viewing on a device such as a computer monitor.

Figure 3:
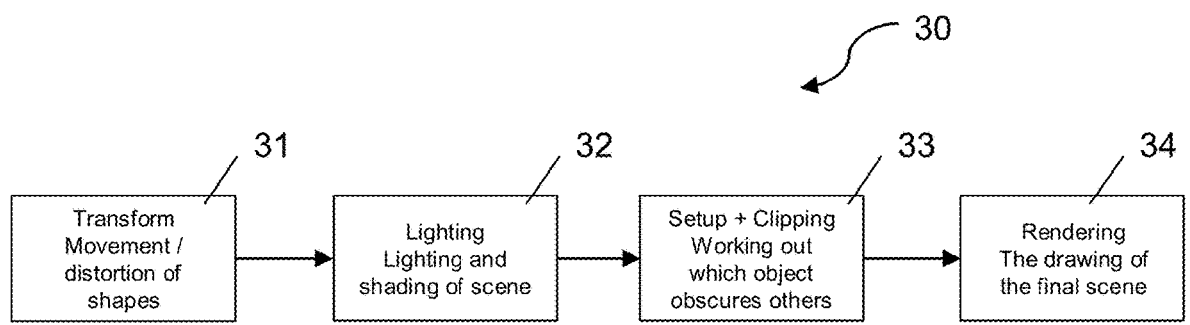
FIG. 3 illustrates the typical processing flow of rendering a scene by a graphics processor.

FIG. 3 shows a typical processing flow of rendering a scene by a graphics processor. The steps are: transformation 31 including movement and distortion of shapes; lighting 32 including lighting and shading of a scene; set-up and clipping 33 involving working out which object obscures others; and rendering 34 that is the drawing of the final scene.

With reference to FIG. 2, a difficulty in trying to obtain information about the shape and position of objects before the graphics processor (paths C to E) is that the position and shape of the object will not have been determined until it has been through the transformation step 31 of the graphics processor. As the objects lie in 3D space, knowledge of which objects are overlapped by others is not available until rendered by the graphics processor.

Taking the information from source A would mean that parallel processing cannot be performed and taking the information from source B, the graphics processor, would mean having to develop a new graphics chip instead of using the best already available on the market at any point in time.

With reference to FIG. 1, in the present invention an instruction interception module 11 feeds a subsidiary graphics processor.

In this topology the main graphics processor 12 is a standard device as used in popular computer graphics cards or games consoles and operates as normal. The subsidiary processors operate in parallel but are fed a different set of instructions according to the requirements of the encoder.

Object Identification

To determine the shape and position of individual graphics objects, the instruction interception module 11 is designed so as to feed the same 3D scene instructions to a subsidiary graphics processor 13 but with the lighting and shading aspects turned off or altered so as to minimise alterations of the textures in a scene. Instead of applying textures, the second processor is instructed to render each shape using a unique, flat colour. Alternatively, it may have an aspect of the colour that makes it unique, such as by using a preset bit-range of the textures/colours to uniquely identify an object. It is then a relatively simple task for the compression encoder 14 to determine the shapes and positions of objects and use this information to pick out the individual objects from the properly rendered image that had been produced by the main graphics processor 12.

In the logic used by the graphics card, the bit-range may cross over the boundary of the range used to describe, say, the blue and red elements of a colour; the whole green range and parts of the blue range may be free to change.

The encoder may comprise of two elements: a pre-processor that works with the subsidiary graphical processor unit (GPU) to extract certain details such as motion vectors; and a 'pure' encoder that receives 'short cuts' from the pre-processor. This enables the use of off the shelf MPEG-4 encoders. The pre-processor may be software that runs on the same processor as the encoder, the instruction interception module, the games processor or a separate processor.

A pre-determined range of colours, shades or colour content could be used to signify that a given shape was translucent. (MPEG-4 allows for objects to be either solid or to have one of 255 levels of transparency).

Furthermore, the direct feed-forward path 15 from the instruction interception module to the encoder could be used to allow the encoder to detect complete scene changes. In such cases that scene should not be compressed as a difference from a previous image (temporal compression) as the differences would be too great.

Although cheaper chips could be used, ideally the subsidiary processor is substantially exactly the same as the main processor, so as to avoid any mismatches between the images rendered, and operates at the same resolution as the main processor.

A number of these subsidiary processors may be used; the number will depend on the encoding technology being used, cost, space and power considerations. As an alternative to having one processor for each piece of information required by the encoder, if the processors and encoder were fast enough, fewer or indeed potentially only one graphics processor could be used. Hence more than one graphics processor function could be implemented with one unit of dedicated graphics processor hardware. In this scenario, the graphics processors could be clocked to render frames more quickly than the final display rate and the results stored in buffer memory in a series of adjacent, non-overlapping locations for the encoder to work on. Handshake signalling between the encoder and the instruction interception module would co-ordinate the processes.

Motion Estimation

The most computationally intensive element of MPEG-4 compression is 'motion estimation' which consumes between 50% and 80% of the processing power.

One of the methods of compressing moving video is in looking for similarities between subsequent frames of video. In an example of a person walking across a field, if the camera is still, then for each frame of video the field will be almost identical. The major changes would occur between where the person was in one frame and where he appears a split second later in the subsequent frame.

In conventional motion estimation the screen is divided into blocks and then compared with blocks of the previous frame, looking for as close a match as possible. Once identified, instead of transmitting the entire block a signal can be transmitted to the decoder that a particular block can be found in a previously transmitted frame but at a given offset from where it should appear in the new frame. This offset is called a motion vector.

Each of these blocks can be just 8×8 pixels. To conduct a search the encoder would first have to look at an offset of just one pixel to the left, subtract each of the 64 pixels of that block from those of the test block, then move one pixel to the left and one pixel up, and subtract all 64 pixels again and compare the results. In a fast moving scene, the offset could be say, 100 pixels away in any direction. This process is thus computationally intensive.

However, in the case of the graphics server of the present invention, to reduce the complexity the subsidiary graphics processor is used to coat each of the 3D objects with a new texture (a coating, or 'skin'). These textures have one aspect of their colours vary in the horizontal position and another vary in the vertical position. If a fixed point is taken on the screen and the pixels of the texture of the object compared at that position between two consecutive frames, it can be determined in which direction that object has moved. So, for example, if that pixel has a higher colour value in the red component, it is detected that it has moved to the right. If it has a higher colour value in the blue component, it is detected that it has moved downwards.

According to one embodiment of the present invention, 32-bit pixels are used (a 'bit' being a binary digit, equalling either 0 or 1). The following is an example of how these bits might be allocated in each pixel:

uuuuuuuuu aaaaaaaa yyyyyyy xxxxxxx

10×u (unique code for each object/texture combo)

8×a (alpha-used to denote transparency. 255=opaque)

7×X (variation of texture in the x axis)

7×Y (variation of texture in the y axis)

So, using an example, but in decimal to make it easier to understand, and only considering the x and y digits, the following pattern may be used:

11 12 13 14

21 22 23 24

31 32 33 34

41 42 43 44

In this example pattern above, one may consider one pixel placed one down and third from the left. In this frame it holds the number 23. If in the next frame the object had moved to the left by one pixel the apparatus would detect the number 24 in the same position on the screen. As the 'x' digit had increased from 3 to 4, the movement is detected as being 1 pixel to the left. If the 'y' digit, namely '2' had decreased to 1, the object has moved down by one pixel.

These numbers are interpreted by the graphics card as colours, so in a 32-bit pixel, the 12 upper-most pixels may be reserved for red, the next 10 for blue and the last 10 for green.

Motion vectors are calculated on a block by block basis, either 8×8 or 16×16, in the current version of MPEG-4. Such motion vectors may be calculated by taking an average of all the x elements and an average of all the y elements.

This block based information may be used to get a motion vector for an entire object (or part of one) by detecting which pixels in each of the blocks belong to a given object and averaging them to deduce the motion vector(s) of that object. (An object may have more than one vector, e.g. a person walking will have limbs moving differently to the body).

Where an object has no sub-elements that might move separately, then once the motion vector is calculated for that object in one block, the apparatus may instantly deduce the motion vector of another block in which that object occupies the majority of pixels.

Motion vectors are applied on a block or macroblock basis. The encoder is adapted to generate a motion vector for an entire block by aggregating the motion vectors of the parts of the objects that occupy that block. In one embodiment, this involves calculating the motion vector of each pixel for each object in a block then calculating the motion vector of each object within that block (which may be different for the entire object over the whole screen) and then calculating the motion vector of that block using a weighted average of the objects within that block.

Typically the entire object includes all the blocks that are deemed to be associated with an object by the encoder whether or not one of these blocks actually contains a pixel that belongs to that object. The motion vector therefore applies to all of the blocks.

When encoding objects (rather than just using objects internally), they are defined as a bounding rectangle such that that rectangle conforms to the grid of 16×16 pixel macroblocks. Many blocks or macroblocks may be totally empty but belong to that Video Object Plane, and hence that object.

In one embodiment, instead of wrapping each object with a unique texture, the method involves projecting a single, screen-sized texture onto the scene, much like a slide projector, and then blending (i.e. binding) that texture with the blank surfaces of all the objects in a scene. The objects' surfaces have been 'cleaned' and replaced with flat, unique colours beforehand so that individual objects can be identified. The blending process combines the projected, 'reference', texture with the objects' surfaces to produce unique textures on each object. Movement causes a 'tear' in this projected 'fabric' and so movement can be easily detected. The reference grid is located at the same position as the viewer.

This last method involves projecting a texture onto the entire scene. This process comprises of first determining a "projection matrix" which maps the texture onto the back plane (the furthest visible plane in the scene). This matrix is then used on each object so as to set its texture mappings to the projected texture. The underlying steps will be familiar to a person skilled in the art of graphics programming.

If the projected texture had the following pattern:
1 2 3 4 5 6
7 8 9 10 11 12
13 14 15 16 17 18
19 20 21 22 23 24
25 26 27 28 29 30

Then after movement by 1 pixel to the left by a 3×3 pixel square in the mid-left of the pattern, the following pattern is attained:
1 2 3 4 5 6
8 9 10 0 11 12
14 15 16 0 17 18
20 21 22 0 23 24
25 26 27 28 29 30

One calculation pass is used to project the texture, the scene is moved and the GPU performs the transformation calculations and moves the pixels on the screen—this is a second pass. The scene is then reset, by removing the projected texture and resetting the objects' surfaces to their initial states and re-projecting the texture. The whole process takes two passes (the re-setting and projecting happen in one pass).

Each of the objects may be pre-coloured with a unique, flat colour and when applying the grid texture, combining the texture with these colours to produce a unique texture for each object (e.g. the red channel is reserved to produce a unique colour for each object and the other channels are reserved to produce the grid texture).

In one embodiment, these methods are implemented by an instruction interception function feeding instructions to a subsidiary graphics processor module that cause it to generate new object textures. These instructions cause it to generate a single texture that covers the entire image frame and binds to the surfaces of the objects in said image frame to produce new object textures. The single texture is projected onto or reflected from the image frame. The step of generating a single texture may include setting the surface of an object to a default and then altering the single texture so as to create and apply a new surface texture for the object. The default indicates whether the object is translucent and is unique to each object in an image frame. The encoder determines the shape and position of objects based on the new object textures.

The invention provides a way to associate a 3D object with its 2D screen representation and to identify not only motion but the amount and direction of the motion. The preferred embodiment is to use a projective texture to cast a reference grid on a scene. A texture is defined that has the same dimensions as the screen and project it from a point at the same position as camera. The effect will be that the entire scene will be covered by the texture.

A texel is a single element within a texture, similar to a pixel being a single screen element. Each texel of the projective texture may, in this embodiment of the invention, be split into a unique X and a Y component representative of its position in the texture. Various texture formats can be selected to accomplish this. The most common 32 bit texture formats typically have a red, green, blue, and alpha components, each occupying 8 bits. More suitable formats such as 10-bit colours or even floating point colours exist, but currently are not as widely supported.

By projecting such a grid on the scene a reference grid is provided that corresponds exactly with the pixel locations of the screen. By projecting this texture before any movement has occurred and then comparing the result against the original after movement then not only can it be detected that motion has occurred but also by how many pixels and what the x and y components of that motion are.

Figure 4:
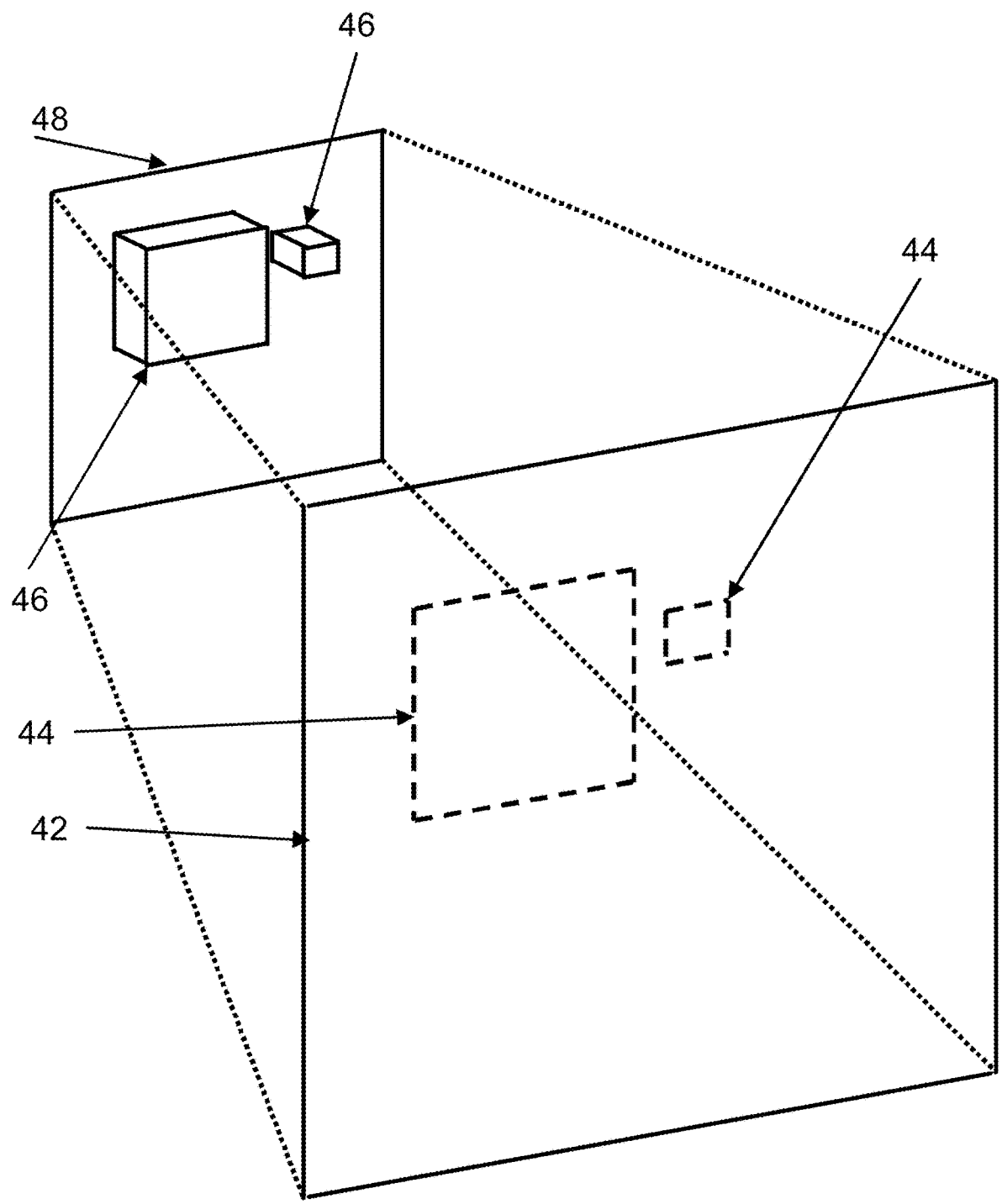
FIG. 4 illustrates a texture being projected onto a simple 3D scene.

FIG. 4 shows a texture being projected onto a simple 3D scene. The dotted lines on the screen 42 show the outlines 44 of the 2D representations of the two 3D cubes 46 that comprise the scene with its background 48.

In order to track motion, a method of storing the current state of the positions of objects relative to the screen is provided, which should do so to a relatively fine level of resolution.

Data that could be used are the object vertices, the texels that form the surface of an object, or the variables that are used to create or move the polygons or texels.

One method of accomplishing this is to allocate a texture to store the screen position of the object across its surfaces—a "texture cache". Each texel in this texture will store a representation of its screen position, determined by projection of the reference texture during rendering. Care must be taken in selecting the size of the texture in order to yield a high enough sampling resolution across the surfaces. Since the apparatus tracks the movement of pixels on the screen that is occurring in the original image, a constant texel to pixel ratio is preferred. Thus, the texture cache used is the same size as the original texture that had been allocated to that object. The original game may have allocated more than one texture to cover various parts of an object where a texture is tiled (repeated) across an object's surface. In the case of tiling the texture cache is made larger by the same multiple as the original texture is repeated across that object's surface.

Using projective texture mapping with the reference grid as the projected texture allows the apparatus, on a per texel basis, to identify where on the screen that texel would appear if it were in the 'real' image (i.e. the one the original programmer had intended).

When the object moves, the texture mapping of the texture cache also changes so that it now corresponds to its new position and this fact is confirmed by the fact that it now contains a different set of reference grid texels. The primary texture now 'knows' where the object's texels are in terms of 2D screen co-ordinates and the storage texture 'knows' where it was in the previous frame.

The screen position is sampled from within texture space, so the normal rendering pipeline cannot be used, as it results in screen space. In other words, the screen space position is rendered into the texture, instead of the normal way of things which is to render the texture into screen space, i.e. produce an image on the screen. When the object moves, the texture mapping of the texture cache will also change so that it now corresponds to its new position. The cache will therefore 'remember' the orientation of its texels with regard to the screen.

Two texture caches are, in this embodiment, maintained: one for the previous frame, and one for the current frame. In an alternative embodiment only one may be used per object or even only one for all objects whereby objects are allocated a portion of a texture instead of the whole texture.

For each frame, render targets may be swapped once at the beginning of the scene to a different texture cache, and the current positions are rendered into that cache. The other cache will still have the previous frame's screen positions. On a per texel basis, then, a subtraction finds the exact screen movement of that texel from the previous frame to this frame. Programmable pipeline hardware can be used to render the texel differences of the current scene into an area accessible by the video encoder for use in completion of the compression sequence. The data stored in this area is the exact motion of the texels that represented each pixel and hence the motion of that pixel.

Since both the texture caches are bound to the object vertices in the same way they will not shift relative to each other. This technique therefore works with movement in the x, y or z axes as well as rotation or distortion through morphing.

Since some parts of a texture may be reused in a mapping, such as the example of a half-face texture being mapped twice, the invention provides a method of making sure a "unique texture space" is used, i.e. one in which there are no overlaps. Otherwise, for each time the texel appears in the image, its current value will be overwritten with the new screen position, and the apparatus would know of only one location of the texel (the last to be rendered), as opposed to all the locations of the texel. To overcome this limitation means having to re-map the vertices to a new texture by copying the original texture to a new texture. This method may be performed by doubling the size of the original texture and adding a constant offset to the vertices that referred to previously mapped areas.

The new texture may be squeezed back to the size of the original and thus shrink the original polygons. Alternatively the original polygon dimensions could be retained but the remapping re-arranged so as not to have so much unused space.

A further method would be to keep the texture caches the same size as the original texture. However, if N triangles are mapped to the original texture, then the caches would be divided into N rectangles. These rectangles would then be divided into two so that there were twice the number of triangles as the original.

The system may then run through all the triangles that are mapped to the original and assign them one of the triangles in each of the texture caches. The fact that the relative positions have changed when being remapped is not problematic as the texture caches are used to render to and hence only require a "unique texture space".

Overview of Implementation

Figure 5:
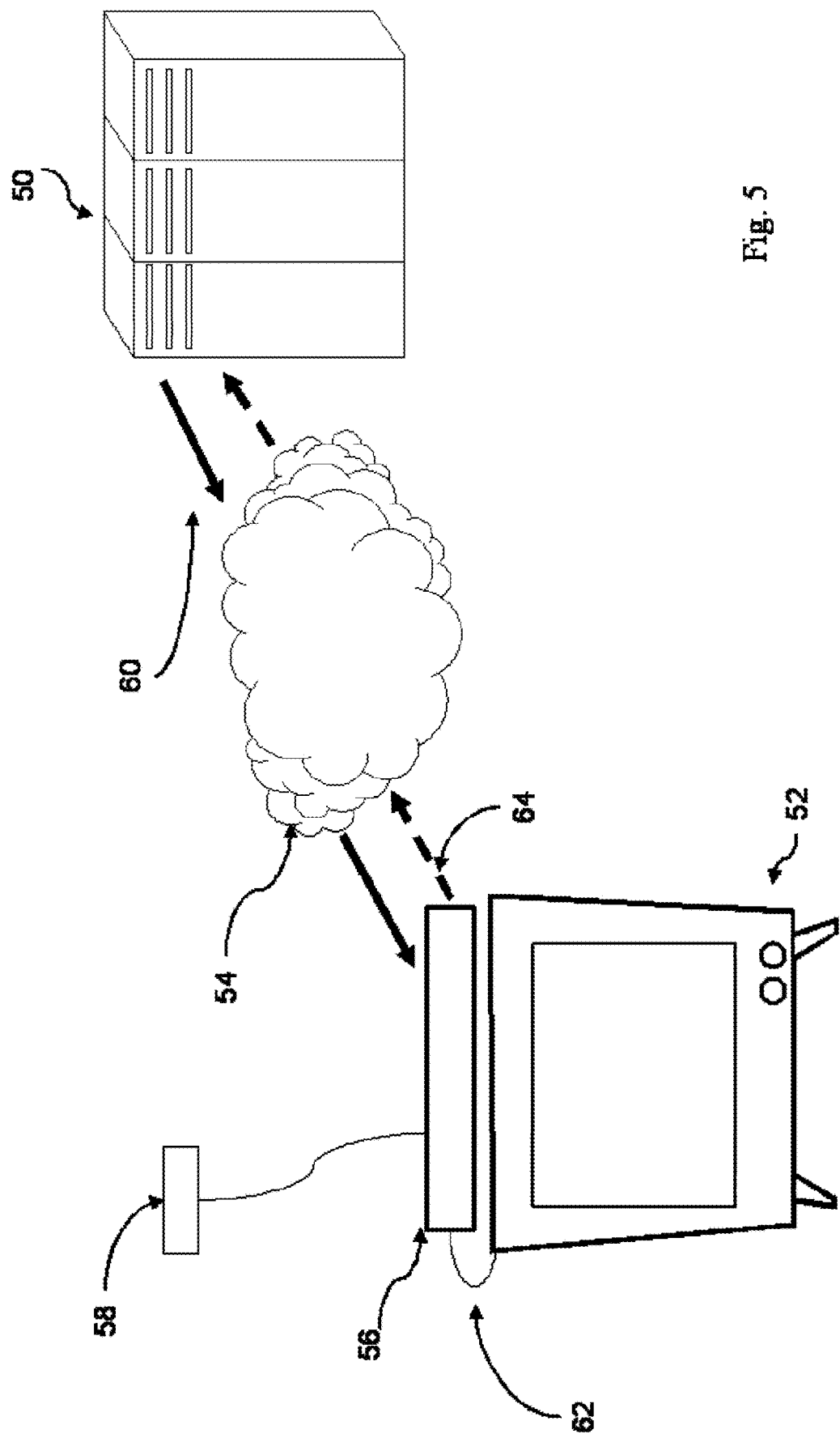
FIG. 5 illustrates an overview of a gaming system according to one embodiment of the invention.

Reference is now made to FIG. 5, which illustrates the main components of a system implementing the present invention. The components include a bank 50 of centralised games servers serving a plurality of user stations such as television terminal 52. The centralised servers and user stations are connected via one, or more, data communications networks 54, such as a cable or satellite broadcasting network and/or a public telephone network. A set top box 56 is provided for, amongst other functions, decoding the compressed video data. A user input device 58, such as a joystick, is provided for detecting user input during a game. The network or networks 54 provide for the transmission of compressed video data 60 from the centralised servers 50 to the user terminals, where the set top box 56 converts the signal to a decompressed video signal 62, and the transmission of user input 64 in the other direction.

Figure 6:
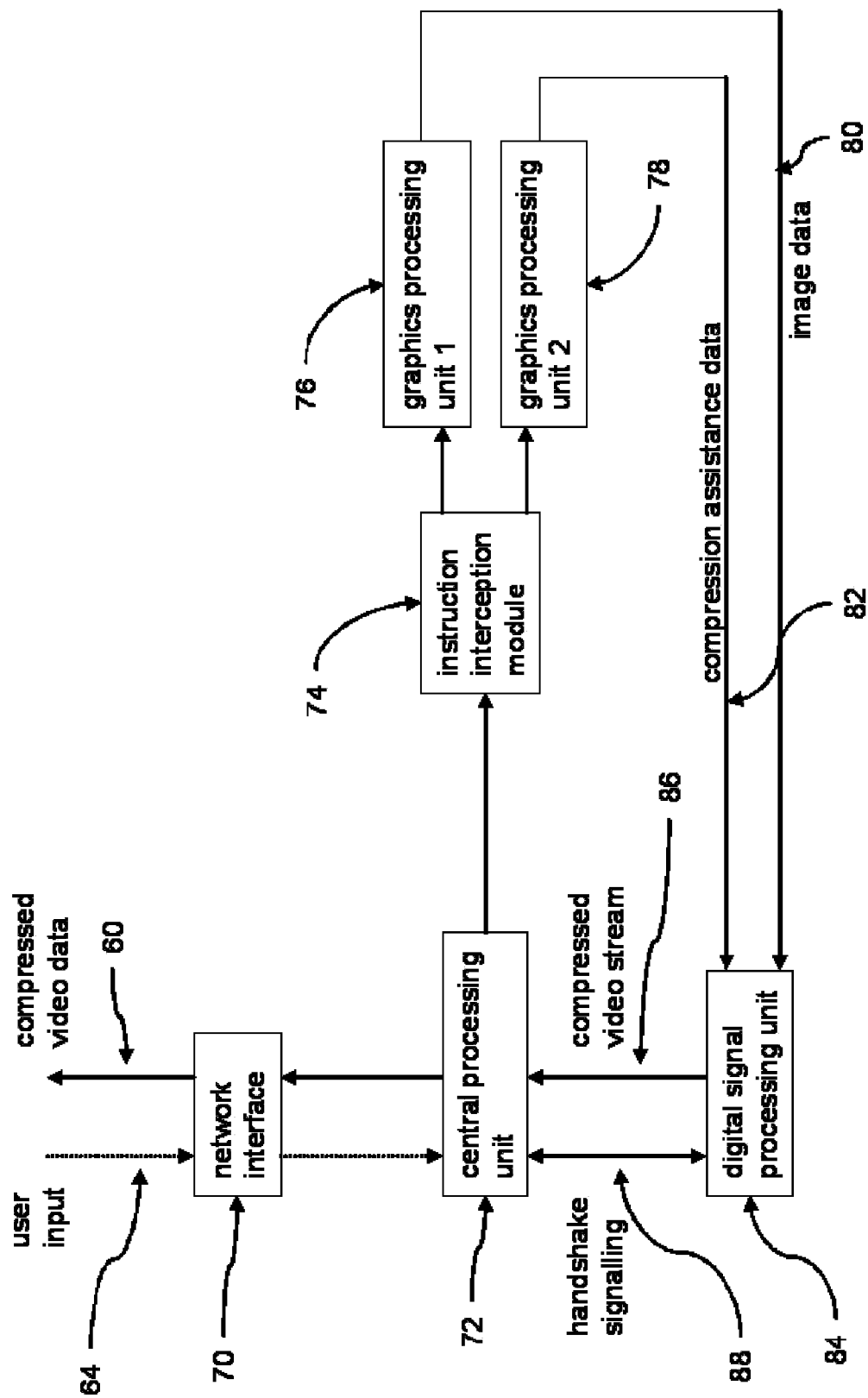
FIG. 6 is a schematic diagram illustrating a single games server according to an embodiment of the invention.

FIG. 6 schematically illustrates features of an embodiment of a single game server in the bank 50 of game servers. User input 64 comes in through a network interface 70 into a central processing unit (CPU) 72 of a conventional personal computer (PC), on which is running a conventional PC game program. The game programs sends a first set of graphics instructions to a first graphics processing unit (GPU1) 76 which is intercepted by an instruction interception module 74, which may be embodied as a software wrapper or hardware form. The first set of instructions, including vertex data, transformation data and texture data are passed to GPU1 76 whilst a specially manipulated version of the instructions is generated and passed to a second graphics processing unit (GPU2) 78. Both the CPUs may be provided on a common graphics card. GPU1 76 renders the image data as the game intended whilst GPU2 78 is used to render specially adapted graphics data from which to extract compression assistance data used for compression, e.g. motion vectors. Each image frame is to be divided into blocks of pixels and then for each block, where possible, the x,y co-ordinates of that block of pixels are found in the previous image frame. A Digital Signal Processing unit (DSP) 84 uses the compression assistance data from GPU2 to compress the image data from GPU1, using a known video compression algorithm, such as MPEG-4, and passes the resulting compressed video stream 86 to the CPU 72 for transmission across the network 54. Handshake signalling 88 between the DSP 88 and the CPU 72 is used for quality control if there is congestion on the network.

Note, in relation to the above that the functions of the DSP 88 can be replaced by another CPU or even a different time slice on the CPU 72. Further, GPU2 78 can alternatively be embodied using another time slice on GPU1 76.

The method of the preferred embodiment allows the movement of objects to be tracked and hence the movement of the pixels, on the 2D screen. Knowledge of the shape and position of a 2D, screen representation of an 'object' is also useful for another compression technique aside from motion estimation. MPEG-4 provides for the possibility of encoding arbitrarily shaped objects. Amongst other benefits this allows the 'blockiness' at the periphery of a shape to be reduced.

It is important to note that the task at this level is to identify the best possible match between a block of pixels in the current frame and a block in the previous frame. It does not have to be an exact match. The encoder can then decide whether it is a good enough match to encode that block in inter-frame mode or to use an intra-frame technique.

A further embodiment of the invention will now be described with reference to FIGS. 7 to 10. The latest graphics chips now have programmable transform and lighting stages instead of (and as well as) the previous fixed graphics pipelines.

These are often referred to as "vertex shaders" (VS) and "pixel shaders" (PS) by Microsoft®. They are sometimes also referred to as "vertex program", "fragment program", "vertex processor" or "fragment processor" by other organisations.

The VS handles all the functions that deal with the moving and transforming of vertices (the 3D points that describe the structure of an object) as well as the lighting, colour and the texture mapping co-ordinates. The PS however deals with such things as textures and how they are applied to objects and some lighting.

Whereas before, a games programmer had to use the fixed pipeline—i.e. a non-configurable process—by using the VS he now has the ability to write a short program (programmable pipeline module) that will execute on the graphics processing unit (GPU).

The game communicates with the VS by first loading a program and then passing in data through a number of "constant" registers. It then passes vertex data through some "input" registers and executes the vertex program. The resulting, transformed vertices then appear in "output" registers. However these registers do not contain data that corresponds to 2D screen co-ordinates but instead as "reciprocal homogenous co-ordinates". Another stage of the GPU pipeline called the "stepper" converts these to 2D screen co-ordinates and clips the vertices according to whether or not they lie within the field of view ("frustum").

To track the motion of pixels across the screen therefore only the changes to the vertices need to be determined after they have been through the transformation stage. To get a pixel-level resolution the apparatus then interpolates across that polygon's surface using the same techniques as would normally be used to apply a texture to the surface of an object. That interpolation function is part of the standard processing pipeline of a GPU.

One way of processing the vertices would be to store them after they have been transformed by the VS and then subtract the vertices of two consecutive frames to calculate the screen movement. This is a viable proposition but then the issue of generating unique texture space should also be resolved.

Alternatively the apparatus could take the difference between the input parameters and process those to end up with the difference between a vertex over two frames. The apparatus thus store all the variables that are used in determining the transformation process of a vertex from the previous frame and then feed them into a new VS program at the same time as the variables used to transform the vertex of the current frame.

In frame 0 the apparatus stores the input variables. In the processing for frame 1, frame 0's variables plus frame 1's variables are input. The altered VS program is very similar to the original except that after having calculated the transformation of a vertex as was intended by the original game programmer, it has been altered so that it will also process the previous frame's vertex using variables stored in different registers. It will then go on to calculate the difference between these two vertices and output that result instead of a single, transformed vertex as was originally intended.

Figure 7:
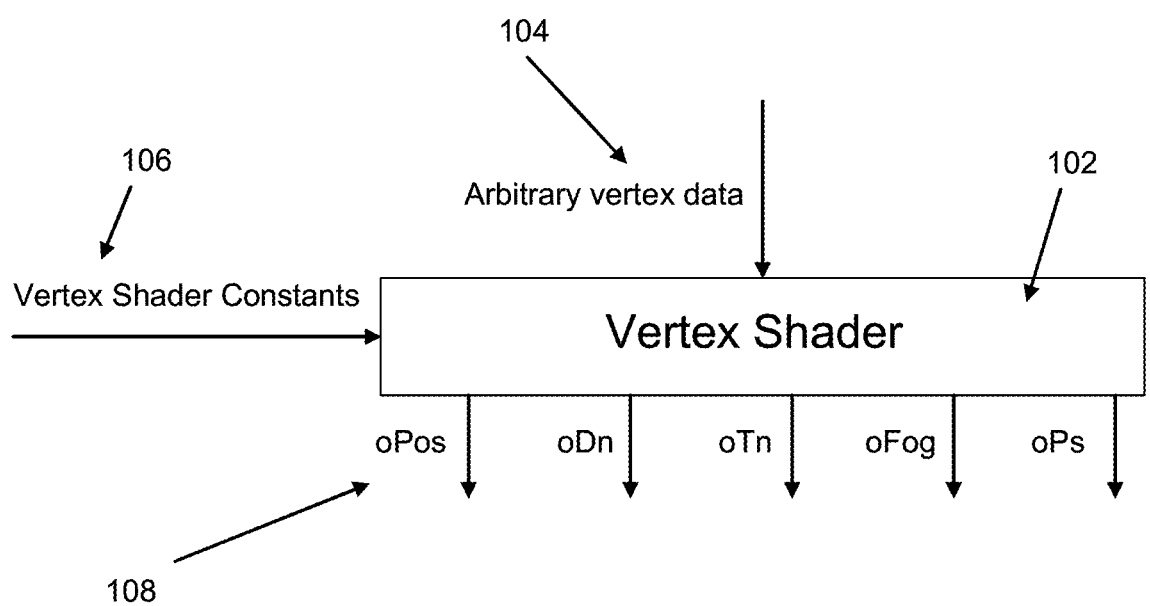
FIG. 7 illustrates, in schematic form, a vertex shader.

FIG. 7 shows a standard vertex shader 102. Note that the input vertex data 104 and vertex shader constants 106 could be in any order. The selection of which constants refer to colour information, lighting, vertex positions, or otherwise is unknown. However, the outputs 108 are defined: oPos is the 'screenspace' position of the vertex, oD0 is the diffuse colour, oD1 is the specular colour, oT0 up to oT3 are four pairs of texture coordinates. oFog is the range of the fog and oPts is the point size for the point sprite processor.

In order to determine which inputs ("vertex shader constants") and which instructions in the VS program are used to determine the new positions of the vertices, the process begins with the output, oPos and works backwards.

Figure 8:
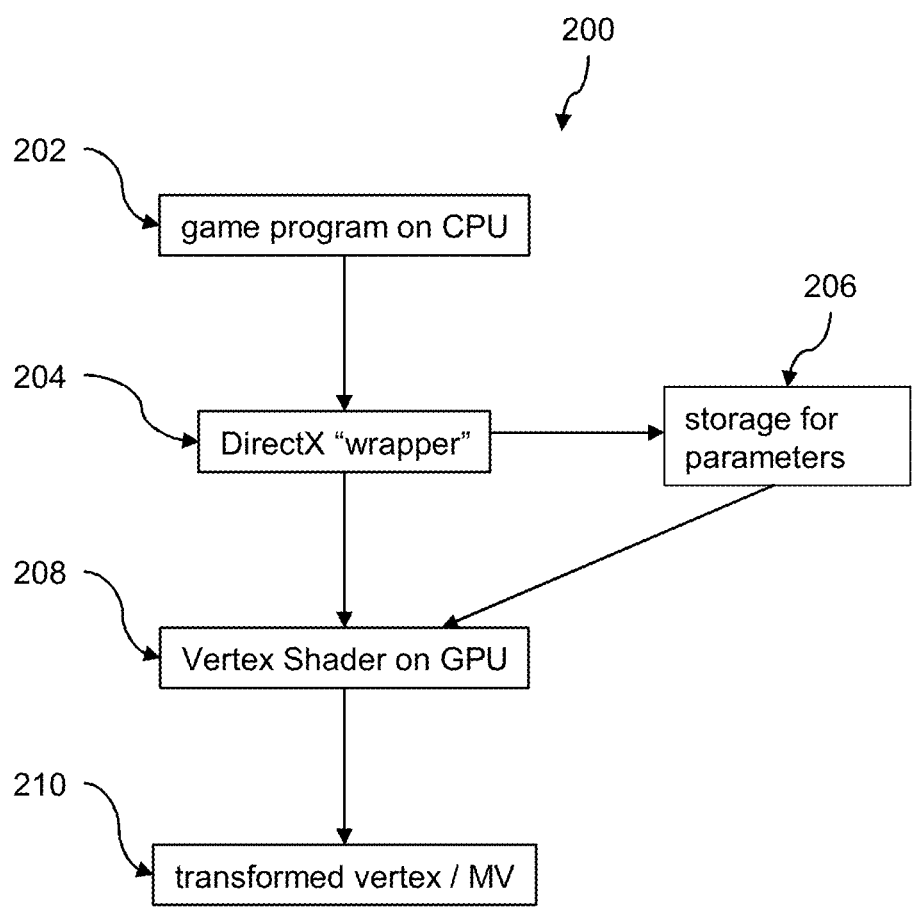
FIG. 8 illustrates, in schematic form, the architecture in accordance with a preferred embodiment of the present invention.

With reference to FIG. 8, in the graphics pipeline 200, a game program on the CPU 202 is shown with a DirectX wrapper 204 and storage for parameters 26. The vertex shader 208 outputs both transformed vertices and motion vectors 210.

With reference to FIG. 9, the steps 300 of the system are shown in processing the first frame, F0.

First 302, The primary (original) VS program is analysed by the DX wrapper and a new, associated program created. Here the process analyses the original VS program, determines which of the instructions and input parameters deal purely with the position of a vertex and creates a new VS program.

The original VS program is then loaded 304 onto GPU.

Next 306, F0 data is loaded as parameters into VS program and a copy is made. All the input parameters used by the original VS program that affect a vertex's position in F0 are stored.

A single vertex of the model is loaded and processed 308. One vertex of the model transformed into screen space is now available (It is actually a 4-D vector in canonical device co-ordinates and another name for it is reciprocal homogenous co-ordinates, RHC, this is converted to screen co-ordinates by a "stepper").

Finally 310, if more vertices of model left, go back to step 306.

With reference to FIG. 10, the steps 400 of the system are shown in processing the second, F1, and subsequent frames.

The original VS program is loaded 402 onto GPU.

Next, 404, F1 data loaded as parameters into VS program a copy is made. All the input parameters used by the original VS program that affect a vertex's position in F1 are stored for processing of subsequent frames.

A single vertex of model loaded and processed 408.

The previously created new, associated VS program is loaded 410.

The input parameters relating to a vertex position from the previous frame, F0, and the parameters for the current frame, F1, are loaded 412 into the new VS program then the same vertex is processed 414 using F0 data and then F1 data and the difference is output. The new VS program processes these two frames' worth of vertices in one pass, subtracts the two results and outputs it through the normal output register of the VS.

If more vertices of the model are left 416, go back 418 to step 402.

Instead of loading and unloading two VS programs, one possibility is to join the two to make one big VS program. An input parameter or an internal variable is used to jump to the appropriate part of the program according to whether the motion vector is to be calculated the image is to be rendered. Using one VS program halves the render state changes (i.e. the system can loop back 420 to step 404) and thus speeds things up slightly.

The rest of the rendering pipeline then continues as normal with the "Stepper" interpolating across a polygon, culling occluded pixels and handing over to the pixel shader for rendering into memory. The only difference is that instead of rendering into screen memory, the pipeline is instructed to render into a different memory location.

Optionally, the two transformed vertices may be output instead of the differences.

The whole of this process is called "parameterisation" and the determining of which parts of the existing VS are relevant to us is known as "register colouring". These techniques are used in compiler theory.

The benefits are in using existing hardware and in avoiding having to recompile the game code and this is done by altering the existing game code specifically by:

the use of register colouring in the context of modifying an existing game program to ultimately determine "information useful for compression". This step is essentially used so as to lessen the amount of input parameters to be stored and then fed into the new VS program as there are only a limited number of input registers. It also allows us to shorten the new VS program by avoiding copying the instructions that determine lighting or colouring of vertices. It is not essential that this is done, but it would be wasteful without it and the risk exists that the new VS program would be too large for the GPU or that too many input registers would be needed which the GPU didn't possess;

the use of the vertex shader to determine motion vectors; and determining which parameters influence the position transformation of a vertex and storing them for processing later.

Vertices could be created dynamically by the game code and sent to the GPU in any order. Some way of recognising them between frames so that the correct pair are subtracted is required. This can be achieved by creating a signature for each vertex. The signature is made up of everything (or at least a number of things) that are used in rendering that vertex, for example which VS program is used to process it.

Current GPU hardware cannot store post-transformed vertices so if there are any complex special effects that require multiple passes this means that the vertex transformations will have to be calculated each time. If it is really complex then the programmer may opt to do those transformations on the CPU instead.

Optionally, a cache may be used to store post-transformed vertices between two or more frames (for use in determining motion vectors).

Normally, a single pass through a VS processes only a single vertex. A GPU may have several VSes that works in parallel but they all use the same render target. To calculate the difference between two vertices would mean swapping the render target. The normal process would be to load vertex 1, run the original VS, load and run the modified VS program, then load the original VS program again, load vertex 2 etc. Swapping targets and render states are overheads and doing so for every vertex would slow the overall processing considerably.

To minimise the delay, all the input details for that complete object may be stored and arranged so that the render target is changed only once before the vertices are processed. This would reduce both the number of render state changes and render target changes.

Another way of reducing state changes would be to have a single VS program. The process could combine the original VS program with the new part to make a larger program and then use one of the input constants as a switch so the single new VS knows which part of its code to process: the original or the new addition. The GPU can only render one pixel at a time so both VS programs may not be processed at the same time. Thus there may be more than one VS program.

Furthermore, instead of having two distinct render targets, the process could have just one that was twice as large as the screen and simply direct the desired image to one half and the difference between vertices data to the other half. This would also help us use only one GPU instead of two. Alternatively the process could embed the two pieces of information in a single image by restricting the rendered image to one range of colours and the difference between vertices data to another range.

For parameterisation to work it assumes that there is enough space for the altered VS program and that there are enough registers to pass in two sets of variables. That will largely depend on the VS program and the capabilities of graphics chip. However, there are things that can be done to help us ensure that the process does not run into problems.

The first is that when the host game program interrogates the device driver of the GPU to ask what capabilities it has, the process can state that the GPU has a smaller VS program store and fewer registers to store variables than that GPU actually supports.

At any one point in time there is a large variation in the graphics cards that are used by end consumers. And so games software must therefore cope with a variety of different capabilities. It is therefore common practice for a game to check the facilities offered by a GPU before trying to invoke one. By stating that the GPU is of a lower sophistication the chances of breaking the game are lessened. Instead, the game would adapt by either dropping that graphical feature or by passing that set of commands to the host CPU instead. The result may only be a minor diminishing of the graphical special effects rather than a breakdown of the games program altogether.

As stated earlier, as well as doing vertex transformation calculations, a VS also deals with aspects such as lighting. Some of the VS program and some registers would therefore be used in a way that has no affect on the motion of pixels on the screen. To reduce the number of registers needed and to make the modified version of the VS program run faster the existing VS program is pre-analysed to determine which parts are relevant.

Sorting out what is and isn't relevant isn't straightforward if there isn't any prior knowledge of the game programmer's intentions, as the input registers aren't segregated. However, in normal operation the VS program will output a transformed vertex using a pre-designated register (which will then be used as the input to another stage in the overall graphics pipeline). Armed with that knowledge the process can work backwards through the VS program and identify every instruction and memory location that has an influence on a vertex co-ordinate, thus building a "dependency graph". From this the process can identify the relevant instructions and input registers. This is a well known problem in compiler theory, and is called "register colouring". The process can then strip out any unwanted instructions.

A GPU may also support a fixed graphics pipeline as well as the programmable type described above. For the techniques described to work the process would have to first produce a PS and VS programs that mimicked the processes of the instructions that would have used the fixed pipeline. These would then be used to replace the original fixed pipeline instructions before applying the techniques of the invention of motion vector generation.

Methods are well known to produce a single block-based motion vector from a group of pixel-based motion vectors and to decide between inter and intra coding.

This embodiment of the present invention has the following features:

using the post-transformed vertices of two frames to calculate motion vectors of pixels on the screen.

doing so by first storing them in memory in such a way that the vertices no longer overlap and then subtracting the two sets of vertices from each other to get the differences using the vertex shader to process the differences in the input variables in order to generate the difference between vertices over two frames.

The "vertex shader" is a type of "programmable pipeline" as is a "pixel shader".

using the vertex shader and/or pixel shader to determine the differences in colour and or luminance over two frames using a larger render target so that the real image and the differences between vertices may be stored as the same "render target"

recording of input parameters for processing later so the process doesn't need to keep swapping render targets analysing the vertex shader program and altering it so as to isolate only those instructions and data that influence the vertex positions themselves lie to the host games program when it interrogates the GPU for its capabilities using the above techniques within only one or more than one VS/PS/GPU (i.e. hacking the existing code in a single GPU, running a new processing cycle with the new code, or using another GPU altogether to run the new code)

extrapolating the differences between vertices over the surfaces of the polygons so as to get "motion vectors" that correspond with the screen pixels.

Differences don't have to be between two consecutive frames—they could be any two frames.

CPUs can have more than one VS and/or PS.

Instead of polygons a game may describe an object using such techniques as "Bezier patches" or "n patches" meaning that mathematical functions are used to describe 3D surfaces instead. Instead of tracking discrete vertices the process may therefore have to track the input variables to higher-level shape description functions.

The techniques of the present invention could be used for 2D objects such as billboards, not just 3D ones.

Optionally the method may be modified to encompass the use of tags with vertices so that it is easier to relate the same vertex between two frames. Some games use dynamically generated vertices to describe scenes. As it is not certain that they will be produced by the game in the same order the process cannot be sure that when the process is determining the difference between two vertices that in fact the process is dealing with the same point of the same object in both cases.

Optionally, instead of tracking all the vertices the process could instead track a lower resolution model such as a simple bounding box or even just two points in space that represent the extremes of the z positions of an object. The process could then apply the transformation functions to these points (maybe in the CPU) and simply extrapolate those post-transformed results to the pre-transformed vertices of the object.

An advantage of the present invention is that it exploits the fact that with synthetic images there is, by the particular methods and means provided by the invention, access to information relating to the images prior to its rendering and that this information can facilitate the compression process. By processing this information in parallel with the rendering of that image the speed of compression and hence reduce the latency of the system can be improved.

Further modifications and improvements may be added without departing from the scope of the invention herein described.

The invention claimed is:

1. A method of generating compressed video data signals comprising the steps of:
 a) outputting a first set of graphics rendering instructions from a first computer program, the first set comprises at least one DirectX instruction;
 b) outputting a second set of graphics rendering instructions from a second computer program, the second set comprises at least one DirectX instruction;
 c) intercepting the first set of instructions;
 d) analyzing the first set of instructions to identify at least one instruction that determines a location that a pixel associated with the instruction is to be rendered to;
 e) generating compression assistance data (CAD), the generating being responsive to the analysis;
 f) processing the first set of instructions to render a first frame comprising at least one new pixel;
 g) processing the first frame using the CAD to generate a first of the compressed video data signals;
 h) transmitting the first compressed video data signal to a first remote decompressing device;
 i) processing the second set of instructions to render a second frame comprising at least another new pixel;
 j) processing the second frame to generate a second of the compressed video data signals; and
 k) transmitting the second compressed video data signal to a second remote decompressing device.

2. The method as claimed in claim 1 wherein:
 the processing of the first and second sets of instructions is controlled using a time-slice processing scheme, the processing being performed by a graphics processing unit (GPU); and
 the pixels of the first frame and the pixels of the second frame are stored in memory locations accessible by the GPU such that the pixels associated with the first frame are stored in different memory locations to the memory locations of the pixels associated with the second frame.

3. The method as claimed in claim 1 wherein step (a) occurs before step (b).

4. The method as claimed in claim 1 wherein all pixel rendering instructions outputted by the first program are processed on a centralized server to render the associated pixels on the centralized server.

5. The method as claimed in claim 1 wherein:
 the first set of instructions is modified before being processed in step (f), the modifying being responsive to the results of the analysis; and
 the modified instructions are processed in step (f).

6. The method as claimed in claim 1 wherein:
 the first set of instructions is modified before being processed in step (f), the modifying being responsive to the results of the analysis;
 the modified instructions are processed in step (f);
 the processing in steps (f) and (i) is controlled using a time-slice processing scheme, the processing being performed by a graphics processing unit (GPU); and
 the pixels of the first frame and the pixels of the second frame are stored in memory locations accessible by the GPU such that the pixels associated with the first frame are stored in different memory locations to the memory locations of the pixels associated with the second frame.

7. The method as claimed in claim 1 wherein:
 the first compressed video data signal conforms to an industry standard compressed video format;
 the processing of the first and second sets of instructions is controlled using a time-slice processing scheme, the processing being performed by a graphics processing unit (GPU); and
 the pixels of the first frame and the pixels of the second frame are stored in memory locations accessible by the GPU such that the pixels associated with the first frame are stored in different memory locations to the memory locations of the pixels associated with the second frame.

8. The method as claimed in claim 1 wherein:
all pixel rendering instructions outputted by the first program are processed on a centralized server to render the associated pixels on the centralized server;
the first set of instructions is modified before being processed in step (f), the modifying being responsive to the results of the analysis; and
the modified instructions are processed in step (f).

9. The method as claimed in claim 1 wherein:
all pixel rendering instructions outputted by the first program are processed on a centralized server to render the associated pixels on the centralized server;
the first set of instructions is modified before being processed in step (f), the modifying being responsive to the results of the analysis;
the modified instructions are processed in step (f);
the processing in steps (f) and (i) is controlled using a time-slice processing scheme, the processing being performed by a graphics processing unit (GPU); and
the pixels of the first frame and the pixels of the second frame are stored in memory locations accessible by the GPU such that the pixels associated with the first frame are stored in different memory locations to the memory locations of the pixels associated with the second frame.

10. A system for generating compressed video data signals comprising:
i) a compressor;
ii) an instruction interceptor;
iii) a CPU; and
iv) a data transmitter;
such that operation of the system causes the system to perform at least the following steps:
a) outputting a first set of graphics rendering instructions from a first computer program, the first set comprises at least one DirectX instruction;
b) outputting a second set of graphics rendering instructions from a second computer program, the second set comprises at least one DirectX instruction;
c) intercepting the first set of instructions;
d) analyzing the first set of instructions to identify at least one instruction that determines a location that a pixel associated with the instruction is to be rendered to;
e) generating compression assistance data (CAD), the generating being responsive to the analysis;
f) processing the first set of instructions to render a first frame comprising at least one new pixel;
g) processing the first frame using the CAD to generate a first of the compressed video data signals;
h) transmitting the first compressed video data signal to a first remote decompressing device;
i) processing the second set of instructions to render a second frame comprising at least another new pixel;
j) processing the second frame to generate a second of the compressed video data signals; and
k) transmitting the second compressed video data signal to a second remote decompressing device.

11. The system as claimed in claim 10 further comprising a graphics processing unit (GPU) wherein:
the processing of the first and second sets of instructions is controlled using a time-slice processing scheme, the processing being performed by the GPU; and
the pixels of the first frame and the pixels of the second frame are stored in memory locations accessible by the GPU such that the pixels associated with the first frame are stored in different memory locations to the memory locations of the pixels associated with the second frame.

12. The system as claimed in claim 10 wherein step (a) occurs before step (b).

13. The system as claimed in claim 10 wherein all pixel rendering instructions outputted by the first program are processed on a centralized server to render the associated pixels on the centralized server.

14. The system as claimed in claim 10 wherein:
the first set of instructions is modified before being processed in step (f), the modifying being responsive to the results of the analysis; and
the modified instructions are processed in step (f).

15. The system as claimed in claim 10 further comprising a graphics processing unit (GPU) and wherein:
the first set of instructions is modified before being processed in step (f), the modifying being responsive to the results of the analysis;
the modified instructions are processed in step (f);
the processing in steps (f) and (i) is controlled using a time-slice processing scheme, the processing being performed by the GPU; and
the pixels of the first frame and the pixels of the second frame are stored in memory locations accessible by the GPU such that the pixels associated with the first frame are stored in different memory locations to the memory locations of the pixels associated with the second frame.

16. The system as claimed in claim 10 further comprising a graphics processing unit (GPU) and wherein:
the first compressed video data signal conforms to an industry standard compressed video format;
the processing of the first and second sets of instructions is controlled using a time-slice processing scheme, the processing being performed by the GPU; and
the pixels of the first frame and the pixels of the second frame are stored in memory locations accessible by the GPU such that the pixels associated with the first frame are stored in different memory locations to the memory locations of the pixels associated with the second frame.

17. The system as claimed in claim 10 wherein:
all pixel rendering instructions outputted by the first program are processed on a centralized server to render the associated pixels on the centralized server;
the first set of instructions is modified before being processed in step (f), the modifying being responsive to the results of the analysis; and
the modified instructions are processed in step (f).

18. The system as claimed in claim 10 further comprising a graphics processing unit (GPU) and wherein:
all pixel rendering instructions outputted by the first program are processed on a centralized server to render the associated pixels on the centralized server;
the first set of instructions is modified before being processed in step (f), the modifying being responsive to the results of the analysis;
the modified instructions are processed in step (f);
the processing in steps (f) and (i) is controlled using a time-slice processing scheme, the processing being performed by the GPU; and
the pixels of the first frame and the pixels of the second frame are stored in memory locations accessible by the GPU such that the pixels associated with the first frame are stored in different memory locations to the memory locations of the pixels associated with the second frame.

19. A method of generating a compressed video data signal comprising the steps of:
   a) intercepting a first set of graphics rendering instructions, the first set comprises at least one DirectX instruction;
   b) analyzing the first set of instructions to identify at least one instruction that determines a location that a pixel associated with the instruction is to be rendered to;
   c) modifying the first set of instructions to create a modified set of instructions, the modifying being responsive to the analysis;
   d) generating compression assistance data (CAD), the generating being responsive to the analysis;
   e) processing the modified set of instructions to render a frame comprising at least one new pixel;
   f) processing the frame using the CAD to generate the compressed video data signal; and
   g) transmitting the compressed video data signal to a remote decompressing device.

20. The method as claimed in claim 19 whereby step (a) occurs before step (b).

21. The method as claimed in claim 19 wherein the intercepted instructions are associated with a computer program and all pixel rendering instructions associated with the program are processed on a centralized server to render the associated pixels on the centralized server.

22. The method as claimed in claim 19 wherein the intercepted instructions are associated with a first computer program, the method further comprises the steps of:
   i) intercepting a second set of graphics rendering instructions from a second program, the second set comprises at least one DirectX instruction;
   ii) modifying the second set of instructions to create a second modified set of instructions;
   iii) processing the second modified set of instructions to render a second frame comprising at least another new pixel;
   iv) processing the second frame to generate a second compressed video data signal; and
   v) transmitting the second compressed video data signal to a second remote decompressing device;
   wherein the processing of the modified set of instructions and the second modified set of instructions is controlled using a time-slice processing scheme, the processing being performed by a graphics processing unit (GPU); and
   wherein the pixels of the first frame and the pixels of the second frame are stored in memory locations accessible by the GPU such that the pixels associated with the first frame are stored in different memory locations to the memory locations of the pixels associated with the second frame.

23. The method as claimed in claim 19 wherein the intercepted instructions are associated with a first computer program and all pixel rendering instructions associated with the first program are processed on a centralized server to render the associated pixels on the centralized server, the method further comprises the steps of:
   i) intercepting a second set of graphics rendering instructions from a second program, the second set comprises at least one DirectX instruction;
   ii) modifying the second set of instructions to create a second modified set of instructions;
   iii) processing the second modified set of instructions to render a second frame comprising at least another new pixel;
   iv) processing the second frame to generate a second compressed video data signal; and
   v) transmitting the second compressed video data signal to a second remote decompressing device;
   wherein the processing of the modified set of instructions and the second modified set of instructions is controlled using a time-slice processing scheme, the processing being performed by a graphics processing unit (GPU); and
   wherein the pixels of the first frame and the pixels of the second frame are stored in memory locations accessible by the GPU such that the pixels associated with the first frame are stored in different memory locations to the memory locations of the pixels associated with the second frame.

24. The method as claimed in claim 19 wherein the intercepted instructions are associated with a first computer program, the method further comprises the steps of:
   i) intercepting a second set of graphics rendering instructions from a second program, the second set comprises at least one DirectX instruction;
   ii) modifying the second set of instructions to create a second modified set of instructions, the modifying being to facilitate sharing a graphics processing unit (GPU) between the first and the second programs;
   iii) processing the second modified set of instructions to render a second frame comprising at least another new pixel;
   iv) processing the second frame to generate a second compressed video data signal; and
   v) transmitting the second compressed video data signal to a second remote decompressing device;
   wherein the processing of the modified set of instructions and the second modified set of instructions is controlled using a time-slice processing scheme, the processing being performed by the GPU; and
   wherein the pixels of the first frame and the pixels of the second frame are stored in memory locations accessible by the GPU such that the pixels associated with the first frame are stored in different memory locations to the memory locations of the pixels associated with the second frame.

25. A system for generating a compressed video data signal, comprising:
   i) a compressor;
   ii) an instruction interceptor;
   iii) a CPU; and
   iv) a data transmitter;
   such that operation of the system causes the system to perform at least the following steps:
   a) intercepting a first set of graphics rendering instructions, the first set comprises at least one DirectX instruction;
   b) analyzing the first set of instructions to identify at least one instruction that determines a location that a pixel associated with the instruction is to be rendered to;
   c) modifying the first set of instructions to create a modified set of instructions, the modifying being responsive to the analysis;
   d) generating compression assistance data (CAD), the generating being responsive to the analysis;
   e) processing the modified set of instructions to render a frame comprising at least one new pixel;

f) processing the frame using the CAD to generate the compressed video data signal; and
g) transmitting the compressed video data signal to a remote decompressing device.

26. The system as claimed in claim 25 whereby step (a) occurs before step (b).

27. The system as claimed in claim 25 wherein the intercepted instructions are associated with a computer program and all pixel rendering instructions associated with the program are processed on a centralized server to render the associated pixels on the centralized server.

28. The system as claimed in claim 25 further comprising a graphics processing unit (GPU) and wherein the intercepted instructions are associated with a first computer program, the system further performing the steps of:
  i) intercepting a second set of graphics rendering instructions from a second program, the second set comprises at least one DirectX instruction;
  ii) modifying the second set of instructions to create a second modified set of instructions;
  iii) processing the second modified set of instructions to render a second frame comprising at least another new pixel;
  iv) processing the second frame to generate a second compressed video data signal; and
  v) transmitting the second compressed video data signal to a second remote decompressing device;
  wherein the processing of the modified set of instructions and the second modified set of instructions is controlled using a time-slice processing scheme, the processing being performed by the GPU; and
  wherein the pixels of the first frame and the pixels of the second frame are stored in memory locations accessible by the GPU such that the pixels associated with the first frame are stored in different memory locations to the memory locations of the pixels associated with the second frame.

29. The system as claimed in claim 25 further comprising a graphics processing unit (GPU) and wherein the intercepted instructions are associated with a first computer program and all pixel rendering instructions associated with the first program are processed on a centralized server to render the associated pixels on the centralized server, the system further performing the steps of:
  i) intercepting a second set of graphics rendering instructions from a second program, the second set comprises at least one DirectX instruction;
  ii) modifying the second set of instructions to create a second modified set of instructions;
  iii) processing the second modified set of instructions to render a second frame comprising at least another new pixel;
  iv) processing the second frame to generate a second compressed video data signal; and
  v) transmitting the second compressed video data signal to a second remote decompressing device;
  wherein the processing of the modified set of instructions and the second modified set of instructions is controlled using a time-slice processing scheme, the processing being performed by the GPU; and
  wherein the pixels of the first frame and the pixels of the second frame are stored in memory locations accessible by the GPU such that the pixels associated with the first frame are stored in different memory locations to the memory locations of the pixels associated with the second frame.

30. The system as claimed in claim 25 further comprising a graphics processing unit (GPU) and wherein the intercepted instructions are associated with a first computer program, the system further performing the steps of:
  i) intercepting a second set of graphics rendering instructions from a second program, the second set comprises at least one DirectX instruction;
  ii) modifying the second set of instructions to create a second modified set of instructions, the modifying being to facilitate sharing the GPU between the first and the second programs;
  iii) processing the second modified set of instructions to render a second frame comprising at least another new pixel;
  iv) processing the second frame to generate a second compressed video data signal; and
  v) transmitting the second compressed video data signal to a second remote decompressing device;
  wherein the processing of the modified set of instructions and the second modified set of instructions is controlled using a time-slice processing scheme, the processing being performed by the GPU; and
  wherein the pixels of the first frame and the pixels of the second frame are stored in memory locations accessible by the GPU such that the pixels associated with the first frame are stored in different memory locations to the memory locations of the pixels associated with the second frame.

* * * * *